(12) United States Patent
Thiers

(10) Patent No.: US 7,887,077 B2
(45) Date of Patent: Feb. 15, 2011

(54) MOTORCYCLE STEERING

(76) Inventor: Jean-Michel Thiers, 1130 Manzano Way, Sunnyvale, CA (US) 94089

( * ) Notice: Subject to any disclaimer, the term of this patent is extended or adjusted under 35 U.S.C. 154(b) by 784 days.

(21) Appl. No.: 11/710,017

(22) Filed: Feb. 23, 2007

(65) Prior Publication Data

US 2008/0202827 A1    Aug. 28, 2008

(51) Int. Cl.
B62K 21/00    (2006.01)
(52) U.S. Cl. .................. 280/276; 280/92; 280/270; 280/277; 180/6.24; 180/6.32
(58) Field of Classification Search ............ 180/6.24, 180/6.32, 124.126; 280/276, 263, 270, 277, 280/679, 92, 93.502, 93.51
See application file for complete search history.

(56) References Cited

U.S. PATENT DOCUMENTS

| | | | |
|---|---|---|---|
| 364,335 A | 6/1887 | Burdess | |
| 388,043 A | 8/1888 | House | |
| 400,727 A * | 4/1889 | Baudreau | 280/276 |
| 431,061 A | 7/1890 | Kenney | |
| 477,583 A | 6/1892 | Van Bibber | |
| 501,501 A | 7/1893 | Gehricke | |
| 538,482 A | 4/1895 | Doan et al. | |
| 1,175,744 A | 3/1916 | Giles | |
| 1,262,625 A | 4/1918 | Berlin et al. | |
| 1,424,822 A * | 8/1922 | Herds | 280/92 |
| 1,623,726 A | 4/1927 | Herds | |
| 2,038,843 A | 4/1936 | Jones | |
| 2,199,966 A | 5/1940 | Timm | |
| 2,339,582 A | 1/1944 | Peterson | |
| 2,411,836 A * | 11/1946 | Seckel | 280/80.1 |
| 2,510,798 A | 6/1950 | Cahill | |
| 2,525,171 A * | 10/1950 | Franks | 280/277 |
| 2,580,064 A | 12/1951 | Albright | |
| 3,110,352 A | 11/1963 | McClarnon | |
| 3,521,904 A | 7/1970 | Sheffer | |
| 3,539,196 A | 11/1970 | Fleming | |
| 4,212,481 A * | 7/1980 | Ribi | 280/276 |
| 4,265,329 A | 5/1981 | de Cortanze | |
| 4,353,567 A | 10/1982 | Weldy | |
| 4,401,316 A * | 8/1983 | Miyakoshi et al. | 280/277 |
| 4,526,249 A | 7/1985 | Parker | |

(Continued)

OTHER PUBLICATIONS

Tony Foale, "Motorcycle Handling and Chassis Design, the Art and Science." p. 7-31 to 7-33.

*Primary Examiner*—Joanne Silbermann
*Assistant Examiner*—Maurice Williams
(74) *Attorney, Agent, or Firm*—Novatech IP Law

(57) ABSTRACT

A steering mechanism for a wheel of a vehicle defining a wheel centerline comprises a four-bar linkage. The four-bar linkage includes a ground link, a coupler link and a spaced pair of follower links. The ground link is connected to the vehicle. The coupler link is connected to the wheel and is located aft of the ground link. The follower links pivotally interconnect the ground link to the coupler link. Each of the follower links defines a link axis. The follower links extend aftwardly from the ground link at diverging angles such that the link axes intersect one another at a steering axis which is positioned forward of the wheel centerline. The steering mechanism may be fitted to a motorcycle having front and rear wheels wherein the four-bar linkage is housed within a wheel hub of the front wheel.

19 Claims, 10 Drawing Sheets

U.S. PATENT DOCUMENTS

| | | | |
|---|---|---|---|
| 4,662,469 A | 5/1987 | Matsuda et al. | |
| 4,685,694 A | 8/1987 | Kouyama | |
| 4,702,338 A | 10/1987 | Trema | |
| 4,741,545 A | 5/1988 | Honma et al. | |
| 4,773,499 A | 9/1988 | Frye | |
| 4,890,857 A | 1/1990 | de Cortanze | |
| 4,951,791 A * | 8/1990 | Belil Creixelli | 180/219 |
| 5,133,223 A | 7/1992 | Morri | |
| 5,361,864 A * | 11/1994 | Tanaka | 180/219 |
| 5,441,292 A * | 8/1995 | Busby | 280/284 |
| 5,462,302 A * | 10/1995 | Leitner | 280/277 |
| 5,782,313 A | 7/1998 | Kurawaki et al. | |
| 5,820,439 A | 10/1998 | Hair, III | |
| 6,095,891 A | 8/2000 | Hoeting et al. | |
| 6,120,048 A | 9/2000 | Li | |
| 6,308,640 B1 * | 10/2001 | Weule et al. | 105/72.2 |
| 6,325,396 B1 * | 12/2001 | Romig | 280/98 |
| 6,786,796 B2 * | 9/2004 | Suto | 446/440 |
| 6,880,846 B2 * | 4/2005 | Schonfeld | 280/283 |
| 6,976,691 B1 | 12/2005 | Song et al. | |
| 6,994,365 B2 * | 2/2006 | Kofuji | 280/277 |
| 7,018,126 B2 | 3/2006 | Henricksen | |
| 7,059,619 B2 * | 6/2006 | Dom | 280/276 |
| 7,648,000 B2 * | 1/2010 | Kimura | 180/219 |
| 2006/0009119 A1 | 1/2006 | Hoeting et al. | |
| 2006/0037797 A1 | 2/2006 | Mathon | |
| 2006/0037799 A1 | 2/2006 | Mathon | |

* cited by examiner

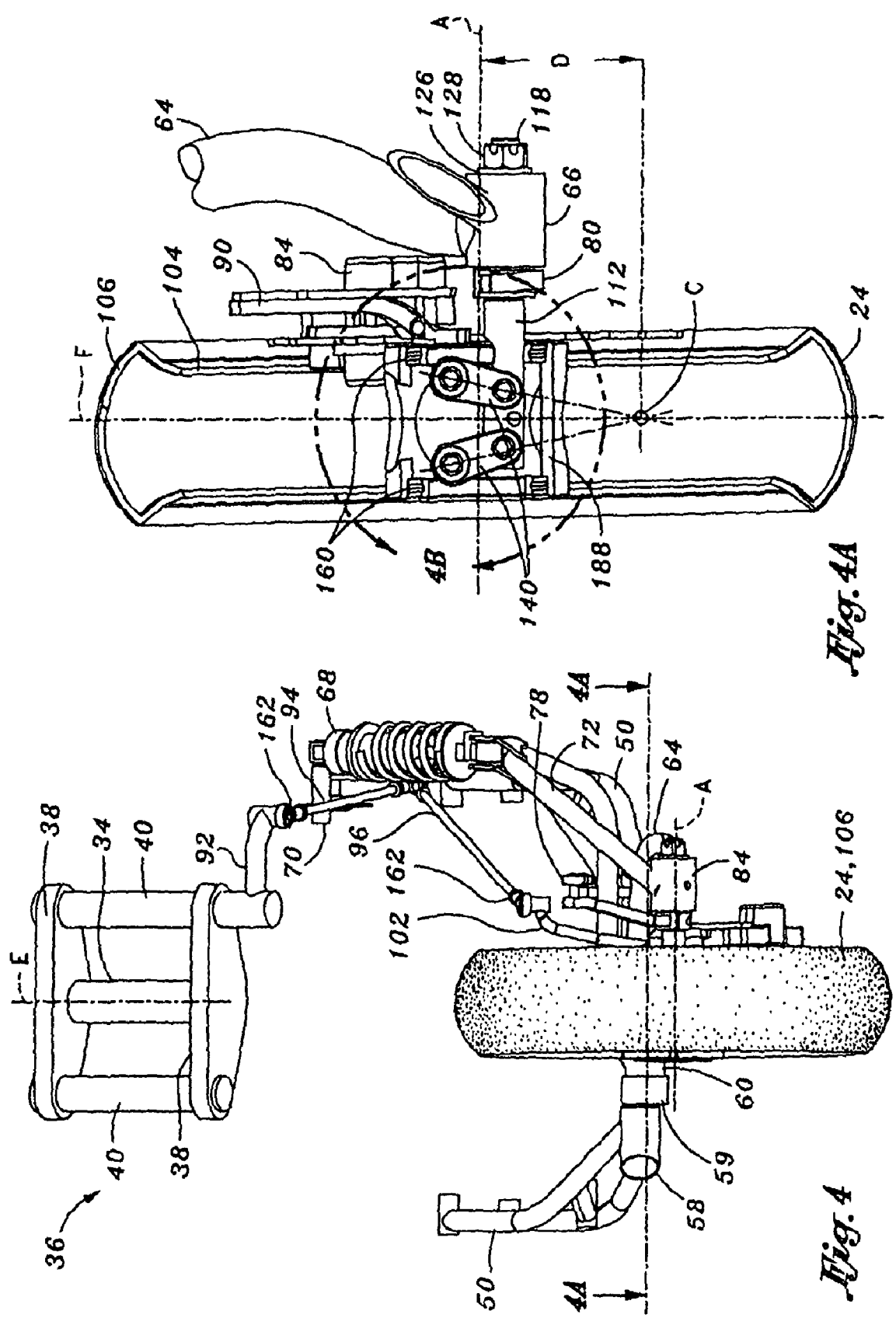

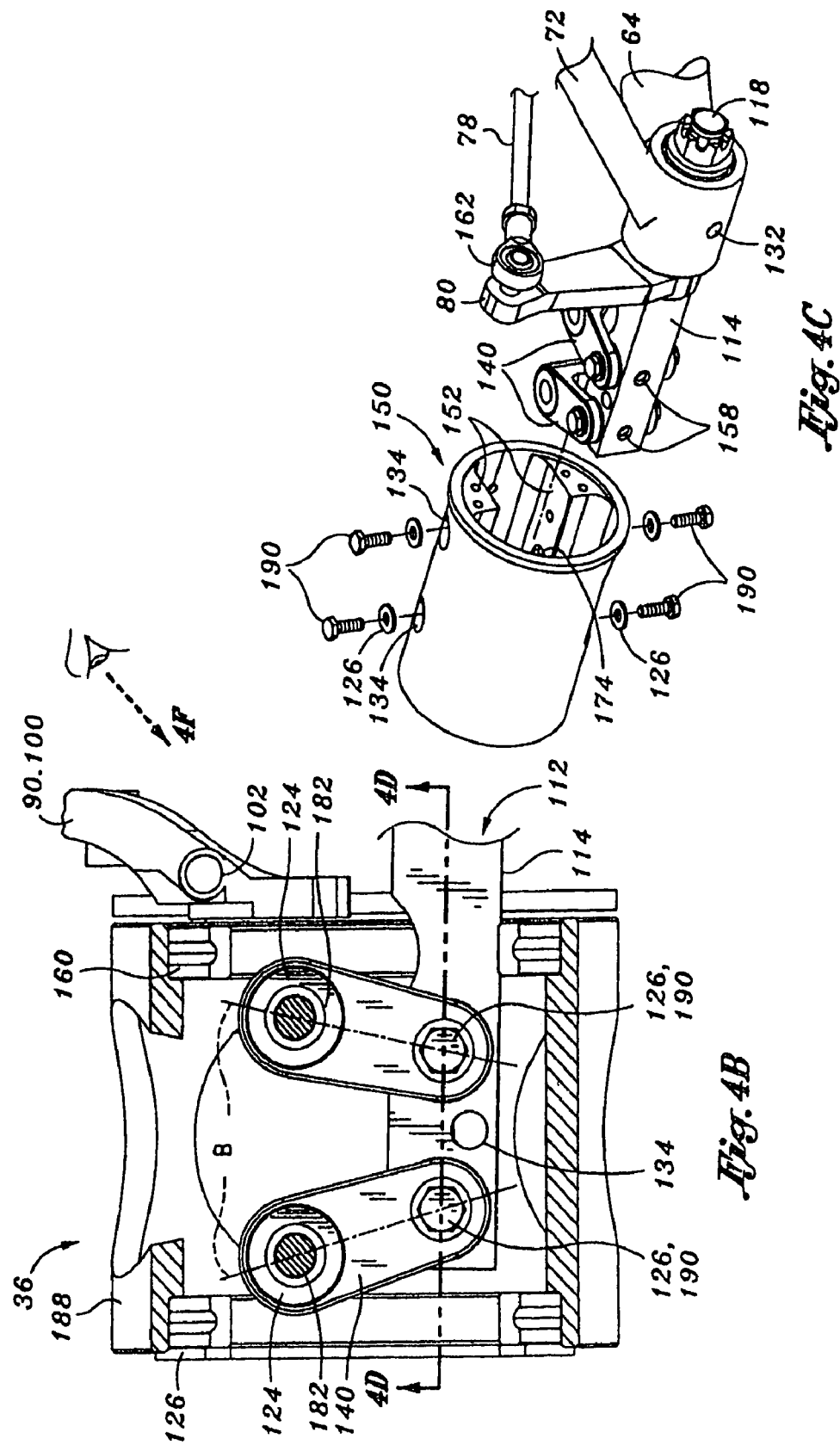

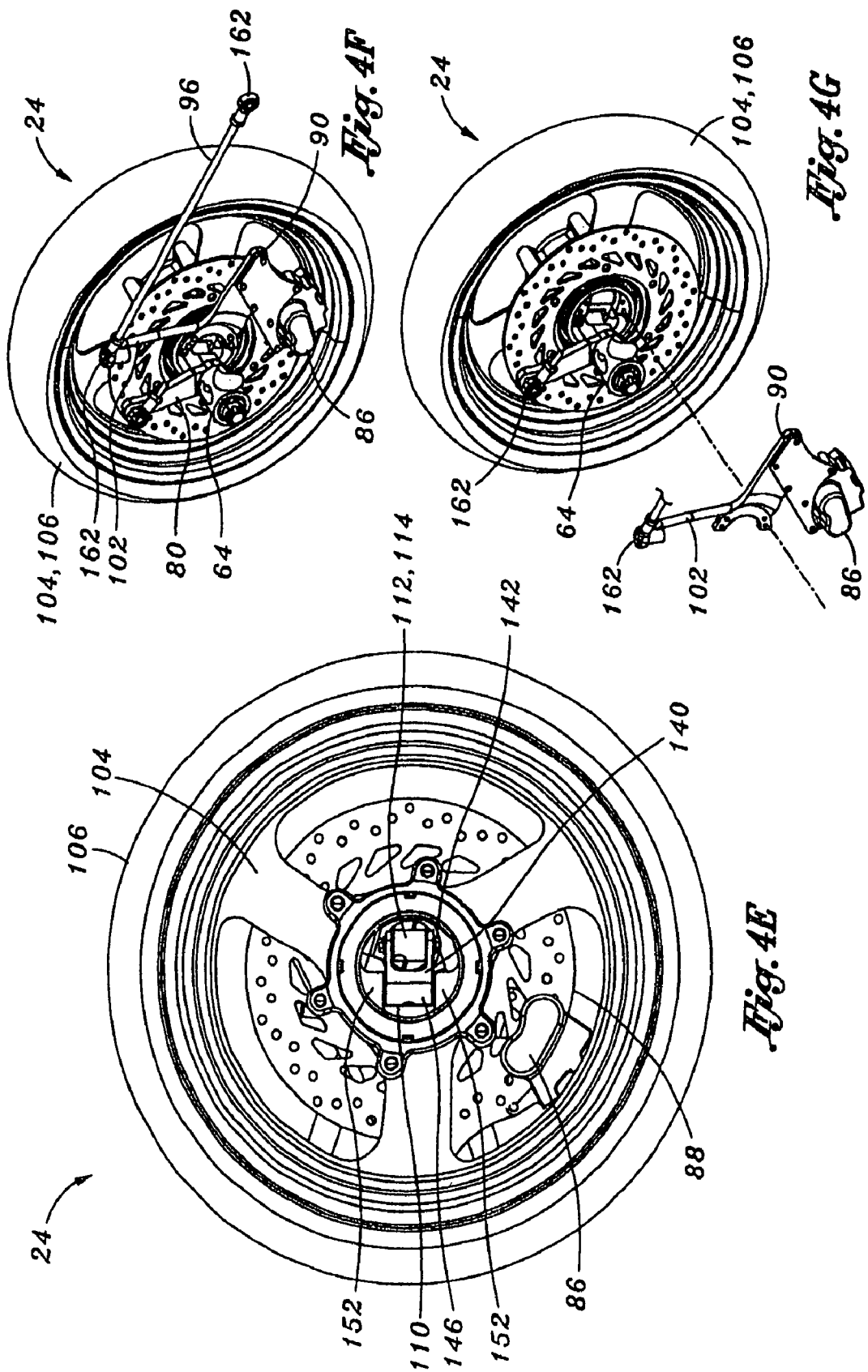

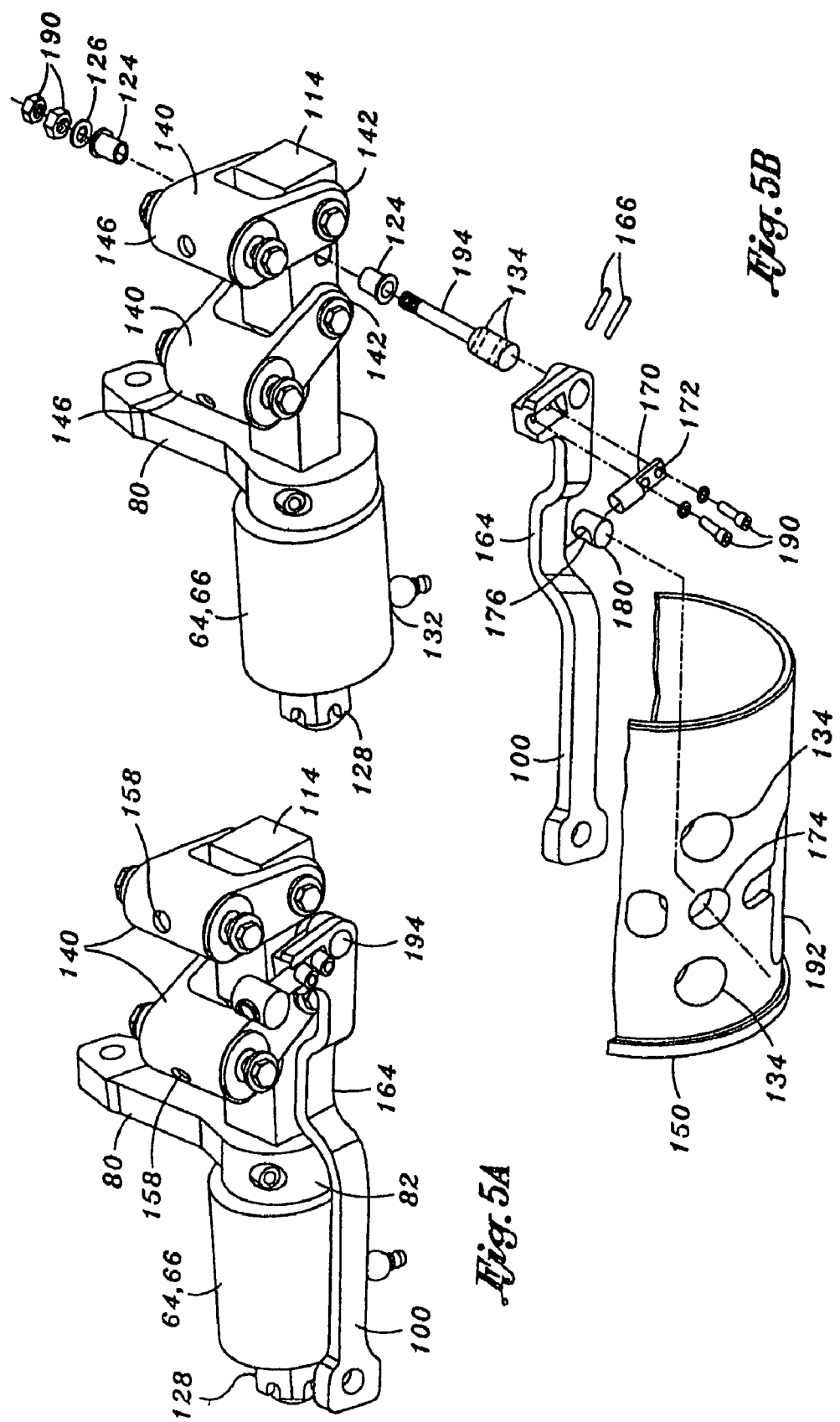

MOTORCYCLE STEERING

CROSS-REFERENCE TO RELATED APPLICATIONS (Not Applicable)

STATEMENT RE: FEDERALLY SPONSORED RESEARCH/DEVELOPMENT (Not Applicable)

BACKGROUND

The present invention relates generally to motor vehicles and, more particularly, to a uniquely configured steering mechanism which may be adapted for use on the front wheel of a motorcycle and which is specifically adapted to minimize the amount of dive experienced by the front end of the motorcycle during braking but which also allows for self-centering of the wheel due to a forward location of a virtual steering axis ahead of the wheel centerline.

Prior art front suspension systems for motorcycles are universally fitted with a pair of telescopic front forks which are attached to a front end of the motorcycle at the steering stem and which have the front wheel mounted to the lower ends of the front forks. The telescopic forks typically include a suspension and damping system for absorbing road shocks transmitted through the telescopic forks via compression springs which also accommodate variations in motorcycle and rider weight. The telescopic forks typically further include a damping mechanism in order to provide a dampening effect against oscillations induced in the compression springs responding to surface irregularities.

The telescopic front forks employed by a majority of motorcycles are pivotable through the use of handlebars by which the rider maintains steering control of the motorcycle. The handlebars typically include additional rider controls such as a throttle for regulating engine speed, a front brake lever for reducing rotational speed of the front wheel, and a clutch lever to selectively engage and disengage the engine from the motorcycle transmission. Various other rider controls may be incorporated into the handlebars including, but not limited to, an engine kill switch, turn signal controls, and headlight controls.

Although the telescopic front fork system has been successfully incorporated into a majority of motorcycles produced up to the present, conventional telescopic forks suffer from several deficiencies which detract from their overall utility. For example, because the front wheel is essentially cantilevered outwardly from the front end of the motorcycle at a relatively long distance from the front end, the front forks themselves as well as the steering head and the motorcycle frame attach points for supporting the steering head must have a sufficiently high cross sectional moment of inertia in order to provide the necessary rigidity and resistance to flexure of the motorcycle frame in response to road shocks.

The high degree of stiffness in the front forks and the motorcycle frame is especially important when the motorcycle is driven at high speeds in order to avoid the development of wobble at the front wheel which can occur as a result of lateral flex in the fork legs allowing the tire contact patch to move away from the steering axis. The ability to resist undue flexing unfortunately results in an increase in weight of the front forks and motorcycle frame. To complicate the matter, heavy front forks generate high inertia in the steering system which results in a steering system that is even more prone to wobble.

Another disadvantage associated with the front telescopic forks of conventional motorcycles is that the point of the steering stem where the front forks are connected to the motorcycle frame is positioned substantially above the motorcycle center of gravity. The relatively high connection point of the front forks further raises the center of gravity which has the unfortunate effect of reducing handling performance of the motorcycle and especially during low-speed maneuvering or when the motorcycle is at rest and supported only by the rider.

A further drawback associated with conventional telescopic forks of the prior art is related to the tendency of the front end of the motorcycle to dive under heavy braking as the weight of the motorcycle is transferred to the front wheel. During front-end dive, the compression springs in the front forks are further compressed which reduces the ability of the compression springs to absorb and dissipate irregularities or bumps in the road during braking. In extreme cases, the phenomena of front-end dive presents a safety issue as the motorcycle can potentially flip forward under severe braking.

Attempts by manufacturers to reduce front-end dive include the use of stiffer compression springs in the front forks. However, the user of stiffer springs has the unfortunate counter-effect of decreasing the capability of the front fork to dissipate smaller bumps during non-braking maneuvers. Manufacturers have also attempted to improve suspensions response by employing special coatings on a stanchion portion of each of the telescopic forks in order to reduce friction and thereby decouple the suspension system (i.e., compression springs) from the effects of road disturbances and braking of the motorcycle.

For example, certain manufacturers such as Bavarian Motor Works, Inc. (i.e., BMW) produce a line of motorcycles which employ an additional front suspension member commercially known as a Telelever™ which pivotally interconnects the lower (i.e., stationery) portion of each of the forks to the motorcycle frame as a means to prevent braking forces from traveling through the stanchion (i.e., moveable) portion of the telescopic forks. Instead, braking forces travel through the Telelever™ and thereby reduces compression of the front forks (i.e., front-end dive) that typically occurs during braking. However, the BMW Telelever™ system mounts and transfer loads to the upper portion of the frame and therefore fails to address other problems associated with conventional front fork suspension systems.

Such problems are related to front-end dive and include an increase in pressure at the contact patch of the front tire during braking which, in turn, increases the bending moment forces experienced at the steering head. The frame attach points of the steering head must have the capability to resist bending forces induced by the bending moments during braking. The need to resist bending results in an increase in the mass of the steering stem and its attach points. In addition, large braking forces transmitted through the contact patch at the front tire necessitate a generally stiff front axle to ensure that each of the telescopic forks compresses or collapses a relatively equal amount.

The ability of the front axle to resist uneven collapsing of the front forks is especially critical when the motorcycle is braking during a turn. Although a certain amount of weight transfer to the front end may be desirable in order to provide a desired amount of pressure on the front tire to temporarily increase the contact patch area and prevent front wheel sliding, an excess amount of front-end dive will result in reduced braking capability at the rear wheel to the extent that the overall braking performance of the motorcycle is adversely affected.

Another drawback associated with telescopic front forks is related to the high moment of inertia as a result of the large mass of the suspension and front wheel assembly rotating about the steering axis. The high moment of inertia can result in the development of a violent wobble at the front wheel at certain speeds. Although many manufacturers include a steering dampener to dampen oscillations occurring as a result of wobble, the added steering dampener unfortunately only further increases the weight and cost of the motorcycle.

Conventional telescopic forks also suffer from the inability to provide a manner for adjusting the spring rate of the compression springs to accommodate varying types of terrain, varying rider styles and varying riding conditions. Unlike conventional rear suspension systems for motorcycles which typically include an exterior mounted compression spring which is relatively accessible, compression springs of telescopic front forks are typically inaccessibly located inside the fork tubes and are not easily adjustable without completely disassembling the forks and completely removing the compression springs.

A further drawback of conventional telescopic front forks of motorcycles is associated with the angle at which the steering stem and forks are oriented relative to vertical and which is commonly referred to as the rake angle. In conventional motorcycles, the rake angle provides a self-steer effect with increasingly greater rake angles of the fork corresponding to a higher tendency of the motorcycle to self-steer which adds some measure of straight-line stability for the motorcycle and which can be advantageous at high speed. Unfortunately, road imperfections which induce off-centered upward forces on the front tire have a tendency to steer the wheel. For example, when encountering a longitudinal rut or groove in the riding surface parallel to the direction of movement of the motorcycle, a high rake angle also makes it difficult for the rider to steer the front wheel out of the rut. In addition, the self-steer effect also causes the motorcycle to drift toward a lower portion of the riding surface on crowned roads making it difficult to steer the motorcycle out of the lower portion.

The rake angle also increases the amount by which the rider must rotate the handlebars in order to effectuate a given amount of turning of the front wheel as compared to an arrangement where the forks are oriented perpendicularly relative to the riding surface. The perpendicular orientation of the forks would provide a one-to-one correspondence between rider input at the handlebars and steering output at the front wheel. A further problem associated with rake angle is related to the fact that during front-end dive, the telescopic forks collapse or effectively shorten, the wheel base (i.e., the distance between the front and rear wheels of the motorcycle) becomes proportionally shorter. Such reduced wheelbase unfortunately decreases the straight-line stability of the motorcycle.

An additional problem associated with rake angle of conventional front fork systems is a tendency of the rake angle to steepen or decrease during front-end dive which unfortunately causes a decrease in trail which is defined as the distance between the front tire contact patch and the point at which the front fork axes intersect the ground. A reduction in the trail as a result of front-end dive results in a decrease in the steering stability of the motorcycle. As is the case with the compression springs in the front forks, the amount of trail of the front wheel is typically preset by the manufacturer and is not easily modified to provide different handling characteristics as may be desired for varying riding conditions. Yet another drawback associated with rake angle is a the occurrence of a lowering of the motorcycle center of gravity in proportion to an increasing steering angle at the front wheel. When maneuvering a heavy motorcycle at slow speed, the lowering center of gravity means that the rider must use greater force at the handlebars in order to steer the motorcycle.

Telescopic fork systems suffer a further disadvantage which is related to the relatively large amount of suspension travel that is designed into the motorcycle in order to allow the front wheel to deflect sufficiently when encountering certain terrain conditions and obstacles. Generally, suspension travel can be defined as the distance over which the front wheel must be able to freely move without limitation in order to effectively absorb and dissipate bumps in the riding surface and accommodate the weight of rider and motorcycle. Unfortunately, the relatively large amount of front-end dive experienced by motorcycles equipped with conventional front forks necessitates a correspondingly large amount of front wheel travel which, in turn, increases the overall frontal area of the motorcycle and the attendant aerodynamic drag at speed.

In light of the above, the prior art includes several attempts to overcome deficiencies associated with steering of various vehicles and, more particularly, front wheel steering and suspension systems for motorcycles. For example, U.S. Pat. No. 364,335, issued to Burdess, discloses a velocipede such as a bicycle or a tricycle incorporating a steering mechanism for a front wheel mounted in a fork. The steering mechanism includes a plunger that compresses a spring contained within a cylinder when the wheel is turned such that the front wheel is biased toward its normal straight-line position in order to enhance stability of the velocipede.

U.S. Pat. No. 388,043, issued to House, discloses a velocipede or bicycle wherein opposing ends of the axle of the front wheel are connected to the bicycle frame by a pair of connecting rods. The connecting rods are constructed of bent form to provide room for turning of the wheel from left to right. The forks upon which the ends of the axle are mounted extend upwardly to a tiller or handlebars. A longitudinal slot is provided in the frame at the junction with the forks to provide adjustability with respect to the length of the connecting rods which connect the axle to the frame.

U.S. Pat. No. 431,061, issued to Kenney, discloses a velocipede having a steering wheel supported by a pivoted fork. The fork is connected with a cross bar or yoke having opposing ends which are connected by links to a similar cross bar which itself is connected to an upright shaft provided with a steering handle. Upon turning the steering handle, the front wheel is turned via the pair of links.

U.S. Pat. No. 477,583, issued to Van Bibber, discloses a bicycle having a front wheel supported by a fork which extends upwardly to a T-head having laterally projecting arms extending equally outwardly therefrom to form a transverse cross bar. The bicycle includes handlebars supported on a vertical member having a pair of laterally projecting arms of equal length forming a second transverse cross bar parallel with the transverse cross bar mounted above the forks. A pair of horizontal links are connected to the ends of each of the transverse cross bars such that turning motion of the handlebars is translated into turning motion of the forks for steering the bicycle.

U.S. Pat. No. 501,501, issued to Gehricke, discloses a child's cycle having a front steering wheel that is of small diameter to allow for the figure of a horse to be mounted thereabove. The front wheel is spaced forward of the rear wheel such that the legs of the user do not come into contact with the hind legs of the horse. A steering mechanism is provided to accommodate the forward placement of the front wheel and comprises a cross bar mounted above the fork which is connected by a pair of links to a corresponding cross bar connected to the handlebars by which the child's cycle may be turned.

U.S. Pat. No. 538,482, issued to Doan et al, discloses a tricycle supported by a front wheel. A front fork supports the front wheel and is pivoted in the frame of the tricycle. A cross-head mounted on top of the fork is connected to a steering lever by a pair of connecting links such that turning of the steering lever effectuates turning of the front wheel.

U.S. Pat. No. 1,175,744, issued to Giles, discloses a steering mechanism for cycles which comprises a mechanism that substitutes a steering wheel for conventional bicycle handlebars. The front wheel of the bicycle is supported by a fork having a laterally extending member mounted. The lateral extending member is connected at each of its opposing ends by a pair of links connected to opposing ends of a turning arm. The turning arm is connected to the steering wheel for guiding or directing the bicycle.

U.S. Pat. No. 1,262,625, issued to Berlin et al, discloses a steering device for a motorized plow wherein the front wheel is supported by a pair of forks having a transverse lever mounted on a forward end of the forks. An arm is positioned forward of the transverse lever in parallel relationship thereto. The transverse lever and arm are connected by a pair of links. The end of a steering shaft is pivotally mounted to a forward part of the arm such that when the steering shaft is turned left or right, the forks are turned enabling turning control of the motorized plow.

U.S. Pat. No. 1,623,726, issued to Herds, discloses a steering mechanism for a motor vehicle comprising a pair of horizontally oriented spring members extending from opposing sides of an axle of a front wheel of a vehicle. Opposing ends of the spring members are in turn connected to a pivotable casting. The casting is rigidly secured to a lower end of a vertically oriented pivot member. Rigidly secured to an upper end of the pivot member is a crank member which is secured to a rotatable steering shaft connected to the steering wheel of the vehicle. Turning of the steering wheel effectuates pivoting of the pivot shaft for controlling the directional movement of the front wheel.

U.S. Pat. No. 2,038,843, issued to Jones, discloses a three-wheeled automobile having two driving wheels in front and one steering wheel behind. The rear wheel is mounted on a rearwardly extending arm pivotally connected to a forwardly extending arm. The forwardly extending arm is mounted on an upright steering spindle whose vertical axis is located aft of the rotational axis of the rear wheel. A steering segment is fixed to the forwardly extending arm and has teeth which mesh with a steering worm gear connected to the steering wheel by means of a shaft to enable directional control of the aft steering wheel.

U.S. Pat. No. 2,199,966, issued to Timm, discloses a hydraulic actuator for a steering mechanism. A hydraulic actuator is connected to the wheel by means of a steering arm mounted atop a fork which has the wheel mounted therewithin. The fork is also connected to an equalization bar which is in turn connected to a control valve by a pair of links. The hydraulic actuator is specifically adapted to allow steering of the wheel at a pre-determined distance and rate best suited for the terrain and speed conditions.

U.S. Pat. No. 2,339,582, issued to Peterson, discloses a castor wheel such as may be used on agricultural machines. The castor wheel is mounted in a fork having an arm mounted on a pivot shaft attached to the fork. Cross links connect opposing ends of the arm to a pedal lever controlled by the operator. The castor wheel minimizes the tendency for the rear end of the machine to slip sideways down a hill or for the castor wheel to swing freely or wobble.

U.S. Pat. No. 2,510,798, issued to Cahill, discloses a single wheel steering mechanism wherein a wheel is carried by a vertically disposed fork mounted on the wheel axle having extending end portions. The opposing ends of the extended portions are, in turn, connected to a foot bar by a pair of connecting rods. The foot bar is in turn connected to a tiller or handle bar by a vertical shaft such that swinging the handlebars to the right or left effectuates a corresponding steering of the wheel.

U.S. Pat. No. 2,580,064, issued to Albright, discloses a fluid pressure-operated steering device wherein a pair of hydraulic motors are alternately operated in order to effectuate turning of a wheel mounted to a telescopic shock-absorbing landing gear. The steering device provides dampening of shimmying tendencies in order to eliminate tortional vibrations of the landing gear.

U.S. Pat. No. 3,110,352, issued to McClamon, discloses a wheeled vehicle steering device wherein wheels on forward and aft ends of the vehicle are cooperatively interconnected such that the wheels are turned in opposite directions to allow for very small turning radii. The steering of the forward and aft wheels is effectuated by handlebars actuating a steering post connected with the wheel steering unit by a set of linkages. One of the wheels of the vehicle is a freely castoring front wheel which swings to a complementary position dependent upon the turning radius.

U.S. Pat. No. 3,521,904, issued to Sheffer, discloses a vehicle structure having a front wheel that is steerable by pivotal movement of a handlebar unit connected to a connector bar. A pair of links attached to opposing ends of the connector bar are pivotally attached to a yoke or fork straddling the front wheel. The yoke and, hence, the wheel structure are pivotally moved in response to pivotal movement of the handlebar unit for steering the vehicle structure.

U.S. Pat. No. 4,353,567, issued to Weldy, discloses a steering and suspension system for a front wheel of a three-wheeled vehicle. The steering system includes a pair of suspension frames that pivotally support the front wheel. A pair of steering arms are pivotally connected to the suspension frames at one end thereof. An opposite end of each of the steering arms is pivotally connected to the vehicle's front cross frame member. Each steering arm moves in an arcuate path in response to a linkage that is actuated by a driver in a manner causing one steering arm to pivot inwardly in a direction opposite to the direction of desired turn of the wheel while the other steering arm pivots outwardly in such a manner that the wheel is leaned into the turn.

U.S. Pat. No. 4,685,694, issued to Kouyama, discloses a steering apparatus including an angle-increasing-mechanism allowing for large steering angles to be imparted to the steering wheel in response to small pivotal angles of the handlebars. The handlebars are pivotally connected to a top plate located forward of the handlebars and interconnected by a pair of connecting rods. The distance from the handlebar pivot to the connecting rod at one end is greater than the distance of the top plate pivot to the connecting rod at the opposing end. This difference results in an increasingly large pivot angle of the top plate with respect to that of the handlebars to thereby form the angle-increasing-mechanism allowing relatively sharp radius turns with smaller angular input at the handlebars.

U.S. Pat. No. 4,773,499, issued to Frye, discloses a steering mechanism having a forkless steerable wheel and axle structure having a hydrostatic motor integrated therewithin. The axle structure is steerable by means of a pair of left and right actuators that cooperate to effectuate steering of the wheel. More specifically, a piston rod of one of the actuators is extended while the opposing piston rod of the remaining actuator is retracted causing the center of the wheel to shift to the right or left depending upon the direction of steering.

U.S. Pat. No. 5,820,439, issued to Hair, III, discloses a gyro-stabilized remote controlled toy motorcycle having a front wheel that is supported for rotation on a fork that is coupled to a steering post. The steering post is inclined aftwardly with its axis passing through the axis of the front wheel to provide a castor effect which tends to turn the front wheel toward the direction in which the motorcycle is leaning which thereby biases the motorcycle toward an upright position when in motion.

U.S. Pat. No. 6,120,048, issued to Li, discloses an auxiliary steering device such as for a tricycle which provides secondary steering in addition to the handlebars. The secondary steering device is connected to the handlebars by two connection rods to enable an adult to manipulate the steering of the handlebars from behind the tricycle.

U.S. Pat. No. 6,786,796, issued to Suto, discloses a radio controlled two-wheeled vehicle toy including a main body having a front fork that is rotatably mounted on the main body. A front wheel mounted to the front fork may be directionally controlled by a steering control portion mounted on a front side of the main body.

U.S. Application No. 2006/0037797 and U.S. Application No. 2006/0037799, filed by Mathon, disclose a motorcycle having a dual beam chassis and a steering mechanism comprising a handlebar linkage controlling a front wheel mounted to the motorcycle. The steering linkage is located inside a tubular front fender housing and comprises a steering shaft extending through a fixed tube and which is coupled to a rotatable tube upon which the wheel is mounted. The steering shaft is driven by an angular mitre gear engaged to an identical gear driven by the steering linkage. A four-bar-linkage disposed adjacent the handlebar communicates angular motion to drive the mitre gear which, in turn, engages the steering shaft to provide directional control of the front wheel.

U.S. Pat. No. 4,265,329, issued to de Cortanze, discloses a frameless motorcycle having a steering mechanism comprises of a handlebar rotatably mounted to a motor of the motorcycle. A control rod extends from the handlebars to a pivoting bracket which, in turn, is connected at an opposite end to a rotatable triangular element mounted on a swing arm extending in a forward direction of the motorcycle. The front wheel is mounted on a swing arm in such a manner that the triangular element which is linked to the handlebars may pivot about an inclined axis in order to effectuate directional control of the front wheel of the motorcycle.

U.S. Pat. No. 4,526,249, issued to Parker, discloses a front suspension system for a motorcycle comprising a pair of upper and lower control arms extending forwardly from the body of the motorcycle. Each of the control arms is connected to a kingpin extending downwardly along one side of the front wheel. The upper end of the king pin is connected to a steering shaft that in turn is connected to the handlebars of the motorcycle such that turning of the handlebars causes the king pin to pivot about the forward end of the lower control arm to effectuate directional control of the front wheel during steering.

U.S. Pat. No. 4,702,238, issued to Trema, discloses a suspension device for a motorcycle wherein the front and rear suspension systems are coupled in a manner which facilitates control of the suspension-shock absorber interaction. The front wheel steering-suspension system comprises an upper arm disposed parallel to a lower arm each hinged to the front chasse and cooperating to support the front wheel. A pivot support is mounted on a forward end of the lower arm and is connected by a rod to the steering handlebars to facilitate directional control of the front wheel.

U.S. Pat. No. 4,741,545 issued to Honma, discloses a front wheel steering device for a motorcycle comprising upper and lower swing arms having their rear ends pivotally joined to the engine case. The front wheel is steerably supported by a knuckle to which an axle of the front wheel is mounted. The forward ends of the upper and lower swing arms are pivotally connected to the knuckle member. The knuckle is angularly moveable for steering the front wheel via the handlebars.

U.S. Pat. No. 4,890,857 issued to de Cortanze, discloses a steerable wheel mechanism for land vehicles having a steering mechanism that is similar to that described above for the de Cortanze '329 reference.

U.S. Pat. No. 5,133,223, issued to Morri, discloses a device for steering a front wheel of a motorcycle and which comprises at least one arm pivotally anchored at its rearward position to the motorcycle frame. The rim of the front wheel is supported by an outer hub within which is coaxially disposed an inner hub. The inner hub is pivotally mounted on a steering pivot which, in turn, is fixedly secured to an axle extending from the forward end of the support arm. A lever is rigidly mounted to the inner hub and is connected to the handlebars by means of a control rod in order to effectuate directional control of the front wheel by pivotal movement thereof about the pivot.

U.S. Pat. No. 5,361,864, issued to Tanaka and U.S. Pat. No. 5,782,313, issued to Kurawaki et al disclose a front wheel swing arm type steering and suspension system for a motorcycle which is constructed similar to the arrangement described above for the Honma '545 and Parker '249 references.

U.S. Pat. No. 3,539,196, issued to Fleming, discloses a vehicle steering assembly for controlling a steerable wheel. The wheel is rotatably mounted on an axle member having opposed ends each of which is connected to supporting struts. The struts extend aftwardly and are pivotally connected at fixed pivot points to a frame of the motorcycle in spaced relation to one another. The strut together with the axle member and the spaced pivot points form a closed four-bar-mechanism in the form of an isosceles trapezoid. The vehicle is steered by pivoting the strut members such that the axle and, hence, the wheel are simultaneously rotated and laterally translated with respect to the vehicle.

U.S. Pat. No. 6,095,891, issued to Hoeting and U.S. Application No. 2006/0009119, filed by Hoeting, disclose a remote control toy vehicle comprising a four-bar-mechanism connecting a front castoring wheel to a chassis of a motorcycle. The front wheel of the motorcycle is mounted on a pair of telescoping front forks extending upwardly to the four-bar-mechanism. The four-bar-mechanism is comprised of left and right spaced members, a fork coupler and a front end frame. The fork coupler is connected to the front fork. The toy vehicle includes a link which is operatively connected to a steering drive and to the four-bar-mechanism on the opposite end in order to deliver steering outputs to the front fork to impart left or right pivoting motion to the front wheel.

Although some of the above-referenced patents disclose steering mechanisms and suspension systems for overcoming certain deficiencies associated with telescopic front forks such as front-end dive, none of the references are understood to disclose an arrangement wherein all of the above-referenced drawbacks associated with telescopic forks are addressed. More specifically, none of the above-mentioned references are understood to disclose a wheel steering and suspension system of reduced overall mass and which allows for a relatively lower center of gravity and improved handling of a motorcycle.

As can be seen, there exists a need in the art for a steering mechanism for a vehicle such as a motorcycle which minimizes or eliminates the problems associated with front-end dive during heavy braking. Furthermore, there exists a need in the art for a steering mechanism for a vehicle which provides a means for improved suspension and handling performance during braking. More specifically, there exists a need in the art for a steering mechanism and suspension system for a motorcycle with improved handling in response to longitudinal ruts or grooves in the road surface over which the motorcycle may be traveling. Additionally, there exists a need in the art for an improved steering mechanism which reduces steering input at the handlebars in order to achieve a given turning radius as compared to the steering input required in conventional telescopic fork suspension systems.

Additionally, there exists a need in the art for a steering mechanism and suspension system for a motorcycle that minimizes shortening of the wheel base and trail throughout the range of suspension travel. Also, there exists a need in the art for a steering mechanism and suspension system for a motorcycle which allows for installation and removal of the front wheel from a single side of the motorcycle without the need to remove other hardware such as the brake components. Finally, there exists a need in the art for a steering mechanism and suspension system for a motorcycle which is of light weight and low cost and which lowers the overall center of gravity of the motorcycle as compared to motorcycles having conventional telescopic front fork systems.

BRIEF SUMMARY

The above-described deficiencies and drawbacks associated with conventional front fork systems are specifically addressed and alleviated by a steering mechanism which incorporates a four-bar linkage comprised of a ground link and a coupler link. Importantly the coupler link is placed aft of the ground link and is interconnected to the ground link by a space pair of follower links. Advantageously, the aft placement of the coupler link relative to the ground link and the diverging orientation of the follower links relative to one another results in the location of the steering axis (i.e., instantaneous center of rotation) of the four-bar linkage that is forward of the wheel centerline which defines a measure of trail in the steering geometry. As is well known, the arrangement of the steering geometry to include an amount of trail provides stability of the wheel when rotating in a forward-moving direction.

Although the steering mechanism of the present invention may be adapted for use on a wheel of any vehicle requiring steering, the present disclosure includes an the four-bar linkage on a swingarm connected to a forward end of the motorcycle. The four-bar linkage is mounted on a free end of the swingarm with the front wheel being mounted to the four-bark linkage. The ground link of the four-bar linkage is connected to the swingarm and is generally oriented perpendicular to a vehicle axis which extends between the front and rear wheels of the motorcycle. The coupler link is connected to the front wheel of the motorcycle.

As was mentioned above, the coupler link is located aft of the ground link and is interconnected to the ground link by the follower links which pivotally interconnect the ground link to the coupler link. Each of the follower links defines a link axis. The follower links extend aftwardly from the ground link at diverging angles such that the link axes intersect one another at a steering axis located forward of the wheel centerline. The four-bar linkage is housed within the wheel hub and the ground link includes a shaft portion which extends outwardly from the wheel hub for mounting to the free end of the swingarm.

The coupler link is configured in a generally hollow cylindrical configuration and which includes a pair of opposing mounting pads upon which are mounted the aftward ends of the follower links. The ground link also includes a beam portion which is housed within the wheel hub and which is adapted for receiving forward ends of the follower links. The wheel hub is fixedly secured to the rim of the front wheel and is rotatably supported on the coupler link by means of a spaced pair of wheel bearings mounted on opposing ends of the coupler link.

Steering of the front wheel is facilitated by means of steering bracket which is adapted to impart lateral movement to the coupler link in response to rider input at handlebars wherein turning force from the rider is transmitted through upper and lower steering links to a steering bracket at the coupler link. The steering mechanism may include a suspension system between the swingarm and the motorcycle frame in order to allow for vertical deflection of the wheel in response to irregularities or bumps in the riding surface as well as to accommodate the weight of the motorcycle and/or rider. In addition, the suspension system is configured to accommodate forward-aft weight transfer during braking and acceleration of the motorcycle.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 is an aft-facing view of the front end of the motorcycle illustrating a pair of left and right support frames pivotally connecting the swing arm to the front end of the motorcycle and further illustrating a set of triple clamps mounted to an upper end of the motorcycle for connecting handlebars thereto;

FIG. 4A is a partial section cut taken along lines 4A-4A of FIG. 4 and further illustrating the four-bar linkage comprised of a ground link fixedly attached to the free end of the swing arm and further comprising a coupler link pivotally connected to the ground link by a pair of follower links;

FIG. 4B is an enlarged cross-sectional view taken along line 4B of FIG. 4A and further illustrating the wheel hub rotatably supported on the coupler link by a pair of bearings and further illustrating a caliper mounting bracket mounted to the coupler link and configured for supporting a brake caliper and a steering bracket;

FIG. 4C is a partially exploded perspective view of the four-bar linkage illustrating the hollow cylindrical configuration of the coupler link in one embodiment of the steering mechanism;

FIG. 4E is a side view of the wheel hub illustrating the attachment of the follower links to mounting pads of the coupler link;

FIG. 4F is a perspective view of the front wheel illustrating the caliper mounting bracket mounted to the coupler link;

FIG. 4G is a partially exploded perspective view of the front wheel illustrating the interconnectivity of the caliper mounting bracket to the coupler link;

FIG. 4I is top sectional illustration of the steering mechanism illustrating the coupler link attached to the wheel and the ground link attached to the frame and located forward of the coupler link;

FIG. 5A is a perspective view of the four-bar linkage illustrating the steering bracket in an alternative embodiment wherein a steering bracket is pivotally mounted to the ground link for actuating the coupler link; and FIG. 5B is an exploded perspective view of the interconnectivity of the steering bracket to the ground link.

DETAILED DESCRIPTION

Figure 1:
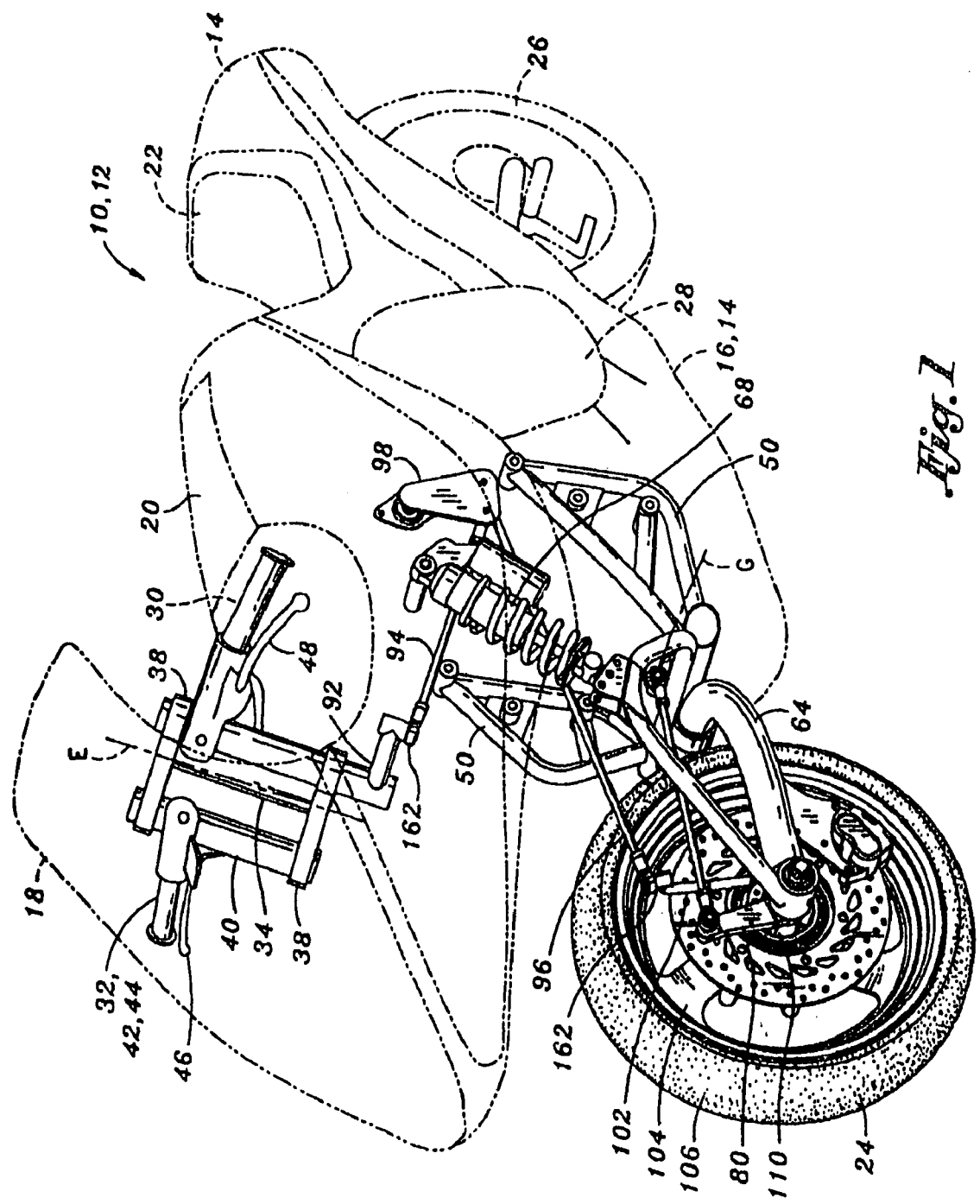
FIG. 1 is a perspective view of a motorcycle having a four-bar linkage steering mechanism connected to a front end of a motorcycle.

Referring now to the drawings wherein the showings are for purposes of illustrating various embodiments of the present invention and not for purposes of limiting the same, shown in FIG. 1 is a perspective view of a motorcycle 12 having a steering mechanism 36 attached to a front end of the motorcycle 12. In its broadest sense, the steering mechanism 36 is comprised of a four-bar linkage 110 which itself includes a ground link 112, a coupler link 150 and a spaced pair of follower links 140 pivotally connecting the ground link 112 to the coupler link 150.

Importantly, the four-bar linkage 110 of the present invention represents an improvement over prior art attempts to incorporate a four-bar mechanism into motorcycles 12. More specifically, in the present invention, the stationary ground link 112 of the four-bar linkage 110 is positioned forward of the coupler link 150 which provides a self-stabilizing effect during forward travel of the motorcycle 12. The use of the four-bar linkage 110 overcomes the above-mentioned drawbacks associated with non-perpendicular steering axis arrangements in which a steering axis "C" of the motorcycle 12 is oriented nonperpendicularly relative to the ground. The non-perpendicular orientation of the steering axis C makes the motorcycle 12 prone to self-steering as a result of off-center upward forces acting on a front wheel 24 of the motorcycle 12. In this regard, the use of the four-bar linkage 110 in the present invention allows for avertical orientation of the steering axis C and thereby prevents the transmission of off-center upward forces at the front wheel 24 to handlebars 32 of the motorcycle 12.

Referring more particularly to FIG. 1, shown is the motorcycle 12 which incorporates the steering mechanism 36 on the front end thereof. As is known in the art, motorcycles are typically steered at the front wheel 24 with a rear wheel 26 being driven by a motor providing power through a transmission. Although the following description and illustrations in the figures are in relation to incorporating the steering mechanism 36 on a motorcycle 12, it should be noted that the steering mechanism 36 may be incorporated for use on any vehicle 10 having at least one steered or turning wheel. For example, it is contemplated that the steering mechanism 36 may be incorporated for use on an automobile such as at the front wheels. In addition, the steering mechanism 36 may be incorporated on any vehicle 10 whether for use on public roads or in off-road environments where it is desirable to separate steering forces from off-center upward forces acting on the front wheel 24.

As is known in the art, motorcycles 12 typically include a motorcycle frame 16 or chassis 14 which is supported by the front and rear wheels 24, 26. The front and rear wheels 24, 26 of the motorcycle 12 define a longitudinal vehicle axis F which is parallel to the direction of forward motion. Certain motorcycles 12 may integrate the engine as a structural or load-carrying frame member through which static and dynamic forces may be transmitted. Thus, the steering mechanism 36 described herein may be adapted for use with or may be connected to such engine structural members.

As is well known, motorcycles 12 typically includes an engine compartment 28 for mounting an internal combustion engine or other engine type. The engine is typically of the reciprocating variety having one or more cylinders and operating in any suitable aspiration mode. A seat 22 and gas tank 20 may be mounted generally above the engine compartment 28 in such a manner that a rider's arms may reach forward of the gas tank 20 to grasp handlebars 32 for steering control of the motorcycle 12 and for regulating various other functions thereof. In this manner, the handlebars 32 act as the steering drive 30 for the motorcycle 12. The handlebars 32 typically also include rider controls such as a throttle 44 hand grip 42, a brake lever 46, a clutch lever 48 and other various rider controls such as an engine kill switch, turn signal controls and headlight controls.

As shown in the figures, the handlebars 32 are typically mounted onto a set of fork brackets or triple clamps 38 which, in turn, are connected to the steering mechanism 36 of the motorcycle 12. In conventional motorcycles 12, the steering mechanism 36 is comprised of a telescopic fork assembly. However, in the present invention, the steering mechanism 36 is replaced with the above-mentioned four-bar linkage 110. The handlebars 32 may be mounted directly to a relatively short pair of fork portions 40 as can be seen in FIG. 1.

Alternatively, the handlebars 32 may be mounted to a set of handlebar clamps integrally formed with the upper one of the triple clamps 38 in a conventional manner as compared to the clip-on style of handlebars 32 that are more common to racing applications. The fork portions 40 are fixedly connected to the triple clamps 38 which, in turn, are connected to a head tube 34 or steering stem which is pivotally mounted to the motorcycle frame 16. The triple clamps 38 are thus pivotable about a handlebar pivot axis E when the rider turns the handlebars 32 left or right.

Figure 2:
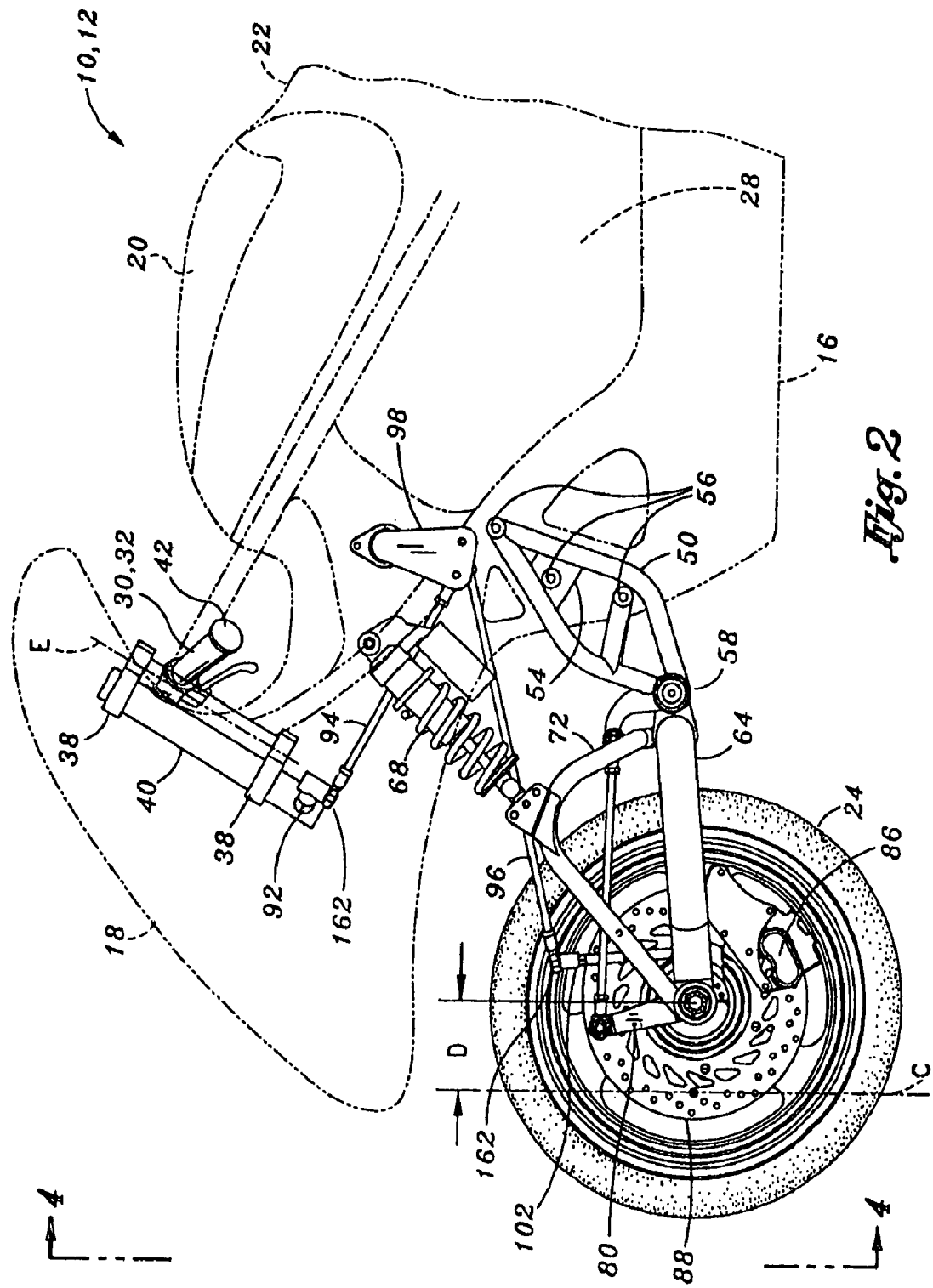
FIG. 2 is a side view of the motorcycle illustrating the four-bar linkage mounted on a free end of a swing arm which is attached to the front end of the motorcycle.

As can be seen in FIGS. 1-4, the steering mechanism 36 may include a control arm 92 rigidly connected thereto and extending downwardly from one of the fork portions 40 such that when the rider turns the handlebars 32 left or right, the control arm 92 moves forward or aft in a slight arcuate motion. An upper steering link 94 interconnects the control arm 92 to a steering bellcrank 98 as can be seen in FIG. 2. Each of opposing ends of the upper steering link 94 preferably includes a ball end fitting 162 threadably connected thereto and having opposing right-hand and left-hand threaded ends to allow adjustment of the effective length of upper steering link 94. As is known in the art, ball end fittings 162 allow for a relatively large degree of motion and are useful in applications where there is a changing angle such as that which occurs between the ball end fitting 162 and the component to it is connected on the steering linkage.

Referring still to FIGS. 1-4, the upper steering link 94 is connected to the steering bellcrank 98 which itself is fastened or connected to a relatively rigid portion of the motorcycle 12 such as the motorcycle frame 16, chassis 14 or engine. A lower steering link 96 interconnects the steering bellcrank 98 to a steering bracket 100 extending toward the front wheel 24. Each of the opposing ends of the lower steering link 96 preferably includes a pair of ball end fittings 162 similar to that described above with respect to the upper steering link 94. Spacers 186 may be included between the ball end fittings 162 and the upper and lower steering links 94, 96 at the connection with the steering bellcrank 98 to increase clearance with the ball end fittings 162. In this regard, the ball end fittings 162 provide the necessary degree of travel as the upper steering link 94 moves forward and aft under rider input at the handlebars 32.

It should be pointed out that although the steering linkage shown in FIGS. 1-4 incorporates the use of the upper and lower steering links 94, 96 acting through the steering bellcrank 98, any number of alternative embodiments or arrangements may be used to transmit steering input by the rider at the handlebars 32 to the four-bar linkage 110. More specifically, any number of linkage arrangements may be utilized to impart lateral movement to a coupler link 150 of the four-bar linkage 110 in a manner that will be described in greater detail below.

As best seen in FIG. 4, the front wheel 24 is supported by a forwardly extending swingarm 64. The swingarm 64 is pivotally connected to the motorcycle 12 by means of a pair of support frames 50 mounted on left and right sides of the motorcycle 12. In addition, as shown in FIG. 2, additional bracing 54 may be included in the support frames 50 in order to allow the placement of attach points 56 for connecting the support frames 50 to the motorcycle 12 front end.

As best seen in FIG. 2, the swingarm 64 is attached to the motorcycle 12 such that a swingarm pivot axis G is positioned above a wheel centerline A. It should be noted that the height of the swingarm pivot axis G relative to the wheel centerline A has an effect on the handling and suspension response and therefore may be selected so as to provide the appropriate characteristics depending on the riding conditions and the type of motorcycle 12. Each of the support frames 50 may be attached to the motorcycle frame 16 or motorcycle chassis 14 and/or to the engine (i.e., as a structural component) via the attach points 56.

In this regard, the support frames 50 may be mounted by means of mechanical fasteners 190 passing through the attach points 56. However, it is contemplated that the support frames 50 may be altogether eliminated and the swingarm 64 connected directly to the motorcycle frame 16 and/or chassis 14 and/or engine by any suitable means. For the embodiment shown in the illustrations, each of the support frames 50 incorporate a swingarm support 58 which, in turn, supports a swingarm shaft 60 and about which the swingarm 64 pivots.

The swingarm 64 may be mounted on the swingarm shaft 60 by means of a spaced pair of swingarm pivot brackets 59 best seen in FIG. 4. The swingarm 64 is supported by the swingarm pivot brackets 59 and in the embodiment shown, is configured as a single-sided swingarm 64 extending laterally forward of the motorcycle 12 and to one side of the front wheel 24. The swingarm 64 may have a generally arcuate shaped to provide turning clearance with the front wheel and is connected to the front wheel 24 near the wheel centerline A. The swingarm 64 is also preferably sized and configured as a rigid torsional member to provide the desired stiffness and resistance to flexing under the weight of the motorcycle 12 and rider as well as in response to forces transmitted upwardly from the road surface.

Therefore, it is contemplated that the swingarm 64 may optionally be configured as a two sided or U-shaped member extending along opposing sides of the front wheel 24 to provide increased resistance to tortional flexing. In this regard, the torsional rigidity may be more readily provided by a two-sided swingarm and would not be as critical as in the case of a single-sided swingarm arrangement. However, a single-sided swingarm 64 provides other advantages including ease and simplicity in installing and removing the front wheel 24 which, in racing applications, may be a critical factor due to the need for frequent and quick tire changes.

The swingarm pivot brackets 59 are preferably constructed so as to provide minimal frictional resistance to pivoting about the swingarm shaft 60 spanning the left and right support frames 50. In this regard, a suitable bearing element such as a bushing 124 made of a suitable material or bearings (i.e., ball bearings, roller bearings, taper bearing) may be integrated into the swingarm pivot brackets 59. Additionally, the swingarm shaft 60 is preferably of a high-hardness material in order to resist wear as a result of pivoting motion of the swingarm pivot brackets 59.

Figure 3:
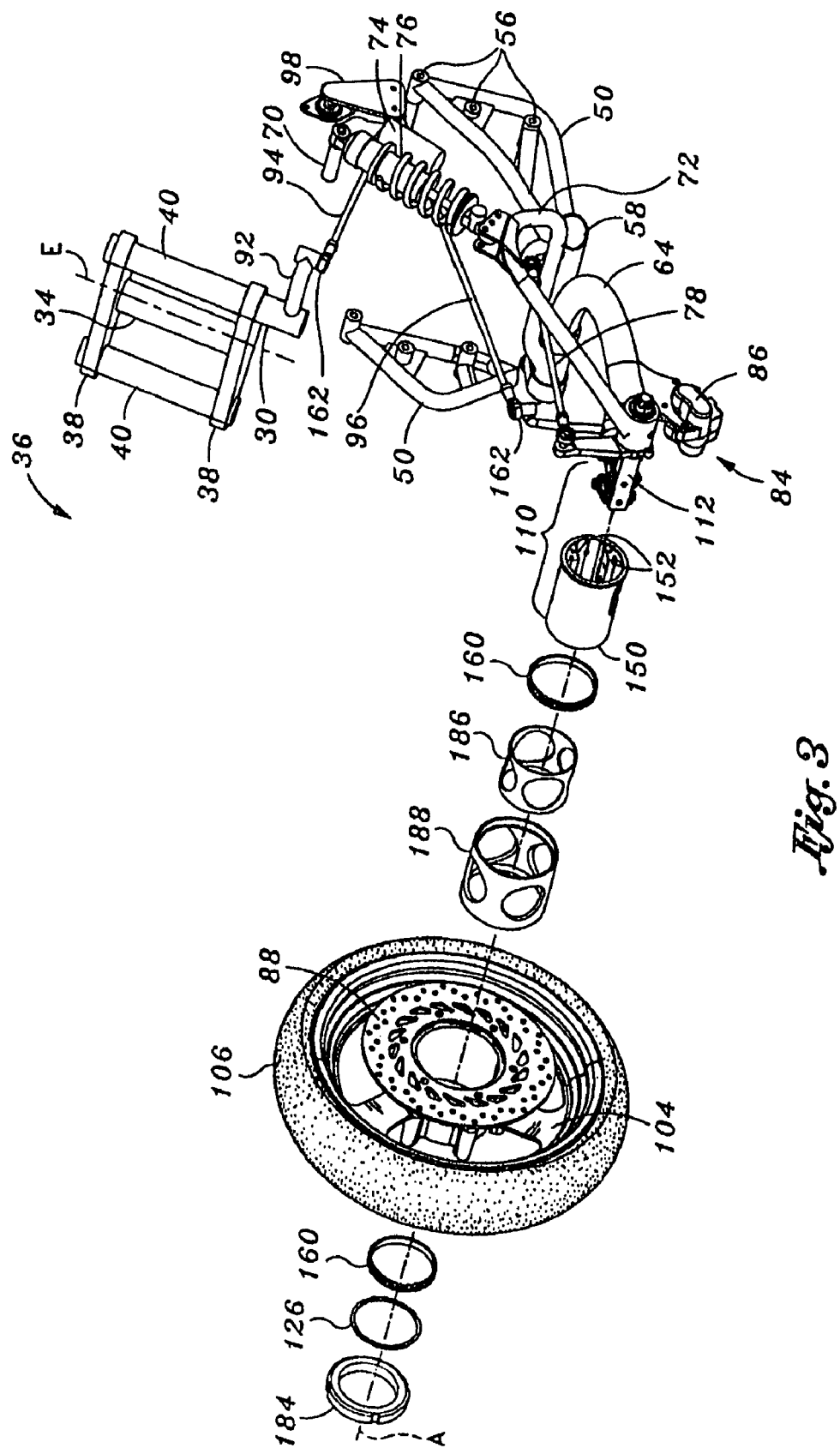
FIG. 3 is an exploded perspective view of the steering mechanism illustrating the components that make up the four-bar linkage and their connectivity to a front wheel hub of the motorcycle.

As can be seen in FIGS. 1-4, the motorcycle 12 may further include a suspension assembly 68 which may be comprised of a shock absorber 74 having a dampening unit integrated therewith. The suspension assembly 68 may be connected to the motorcycle 12 at an upper shock mount frame 70 and may be connected to the swing arm 64 at a lower shock mount frame 72. The upper shock mount frame 70 is best seen in FIG. 3 and is configured as a laterally extending elongate tubular member which is connected to the motorcycle frame 16. The lower shock mount frame 72 is also configured as a arch-shaped or bowed tubular member but which is mounted to opposing ends of the swingarm 64 in order to minimize bending in the middle of the swingarm 64 as would occur if the shock absorber 74 lower mount were attached thereto.

In this regard, the lower shock mount frame 72 together with the swingarm 64 forms a triangular member which may increase the overall stiffness of the swingarm 64 in the vertical direction. The lower shock mount frame 72 can be seen as extending slightly laterally outwardly from the swingarm 64 in order to provide clearance to the front wheel 24 when turning from side-to-side. The shock absorber 74 itself is attached to the upper and lower shock mount frames 70, 72 such as by using conventional bushings 124 captured between U-shaped brackets that may be welded to the upper and lower shock mount frames 70, 72. In this regard, it can be seen in FIGS. 1 and 4 that the swingarm 64 is also arcuately shaped in such a manner as to prevent contact with the front wheel 24 to allow it to freely move from left to right during turning.

It should be emphasized that the specific arrangement of the suspension assembly 68 mounting and, in particular, the arrangement of the lower shock mount frame 72 shown in the figures is exemplary only and should not be construed as limiting alternative arrangements for mounting the suspension assembly 68. For example, it is contemplated that the suspension assembly 68 may be altogether eliminated with the swingarm 64 being rigidly connected to the motorcycle frame 16. Although such an arrangement may only be desired in highly specialized applications, the disclosure provided herein should not be construed as limiting the embodiments to those which necessarily include a suspension system for the front wheel 24.

The four-bar linkage 110 is mounted on an end of the swing arm 64 and a leveling rod 78 prevents rotation thereof. The leveling rod 78 has opposing ends each of which preferably includes a ball end fitting 162 similar to that which is described for each of the lower and upper steering links 94, 96. At the forward end of the leveling rod 78, the ball end fitting 162 is attached to a leveling bracket 80 which is non-rotatably mounted to the ground link 112. At the aft end of the leveling rod 78, the ball end fitting 162 is secured to a portion of the support frame 50 that is located adjacent to the swingarm pivot axis G. Appropriate spacers 186 may be utilized between the ball end fittings 162 and the leveling bracket 80 at the forward end or the swingarm support frame 50 at the rear end of the leveling rod 78 to provide clearance therewith.

Referring briefly to FIGS. 4F and 4G, shown is the interconnection of a brake caliper 86 to the front wheel 24 by means of a caliper mounting bracket 90. As can be seen in FIG. 4G, the caliper mounting bracket 90 may be interconnected to the coupler link 150 by extending fasteners through the caliper mounting bracket 90 and into the threaded bores 134 formed in the side of the coupler link 150. The caliper mounting bracket 90 can be seen as supporting the brake caliper 86. As is known in the art, the brake caliper 86 is one component of a disk brake assembly 84 which is specifically adapted to engage a brake rotor 88 or disk for slowing or stopping the rotation of a wheel. As can be seen in FIGS. 4F and 4G, the brake rotor 88 is rigidly secured to the front wheel 24 by means of a series of fasteners angularly spaced about a wheel hub 188. The brake caliper 86 contains a spaced pair of brake pads formed of frictional material. During operation, when the brake pads are engaged or squeeze together by the brake caliper 86, the friction generated between the brake rotor 88 and the brake pads causes the wheel rotation to slow.

As shown in FIGS. 4F and 4G, the caliper mounting bracket 90 may further include a steering bracket extension 102 rigidly attached thereto and extending upwardly to interconnect to the ball end fitting 162 of the lower steering link 96. It should be mentioned that the specific configuration and location of the brake caliper 86 is exemplary only and should not be construed as limiting. For example, it is contemplated that the brake caliper 86 may be positioned forward of the wheel centerline A or in any other position relative thereto. Likewise, the configuration of the steering bracket extension 102 is not specifically limited to that which is shown in FIGS. 1-4G but may also include alternative embodiments such as the steering bracket 100 illustrated in FIGS. 5A and 5B and which is described in greater detail below. Regardless of the specific configuration, the handlebars 32 form the steering drive 30 which is specifically adapted to impart lateral and/or sideways motion or movement to the coupler link 150 in order to turn the front wheel 24 for steering the motorcycle 12.

Referring more particularly to FIG. 3, shown is the front wheel 24 of the motorcycle 12 in an exploded view illustrating the componentry for rotatably mounting the front wheel 24 to the four-bar linkage 110. In this regard, the four-bar linkage 110 can be seen as being fixedly secured to a free end of the swingarm 64 wherein the ground link 112, comprised of a beam portion 114 and a shaft portion 118, extends through a hollow shaft housing 66 formed in the swingarm 64. On an extreme end of the shaft portion 118 is a threaded portion 122 which is adapted to have a castellated nut 128 threadably engaged thereto with a cotterpin 166 passing through a cotterpin hole 130 to prevent unintentional loosening of the castellated nut 128. Opposing sides of the shaft housing 66 may be fitted with bushings 124 and/or bearings in order to allow for free rotation and support of the ground link 112 on the free end of the swingarm 64. A lubrication hole 132 may be formed in the shaft housing 66 such as for accepting a grease fitting such as a Zirc™ fitting for providing lubrication such as grease to the bushings 124.

Figure 4D:
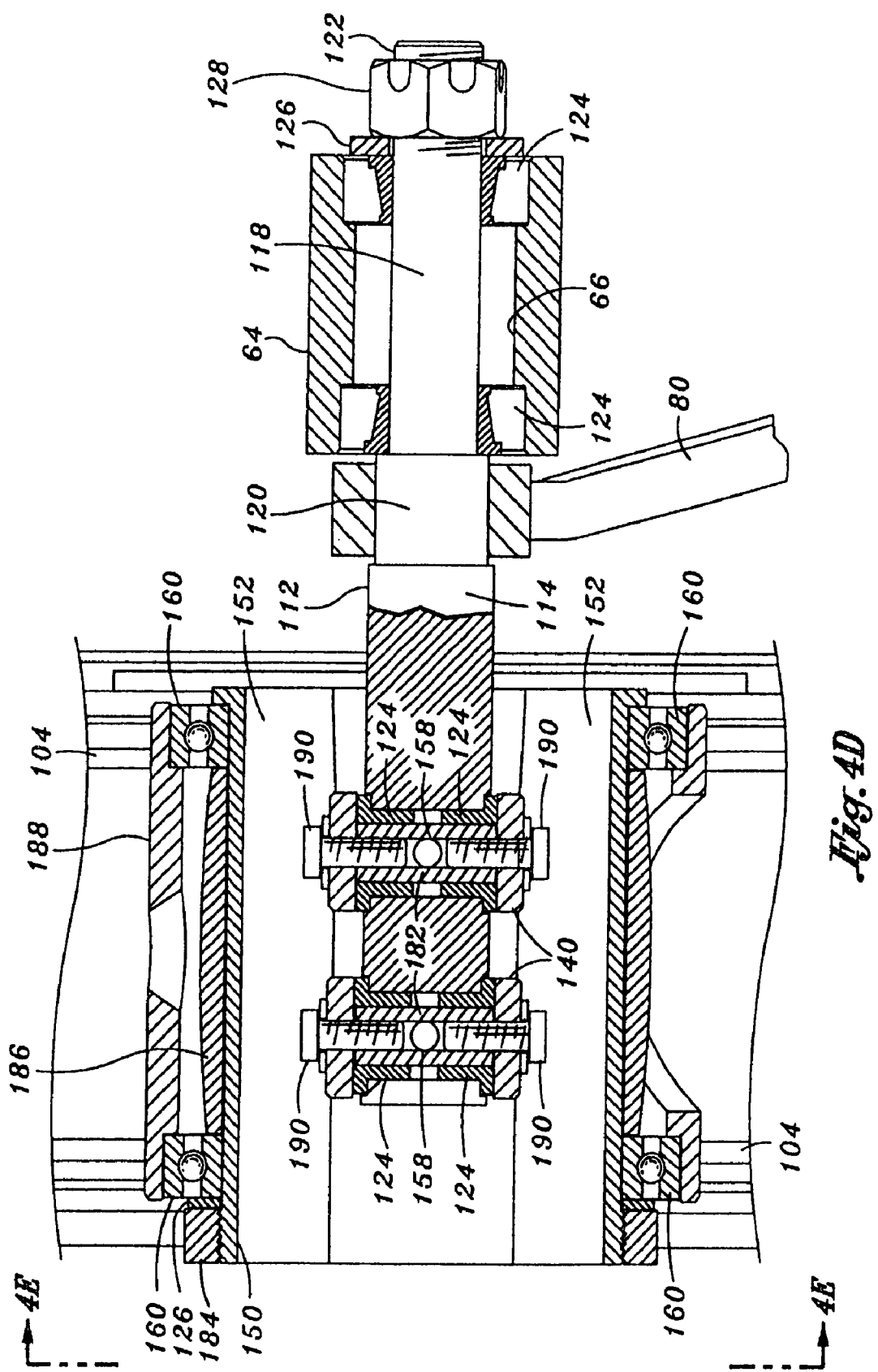
FIG. 4D is a partial section view taken along lines 4D-4D of FIG. 4B and illustrating the interconnectivity of the coupler link to the wheel hub and further illustrating the interconnectivity of the follower links to the ground link.
Figure 4H:
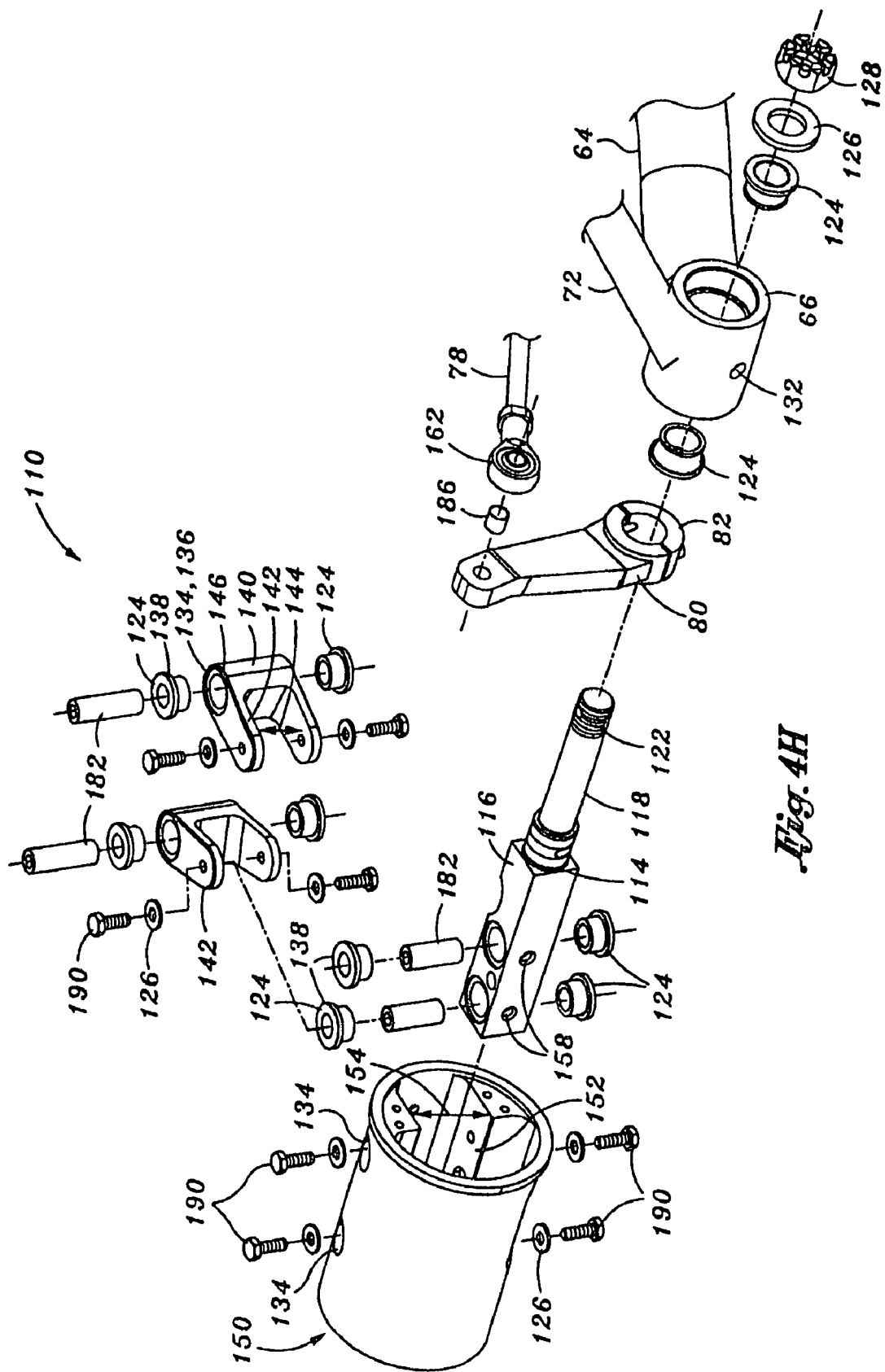
FIG. 4H is an exploded perspective view of the four-bar linkage.
Figure 41:
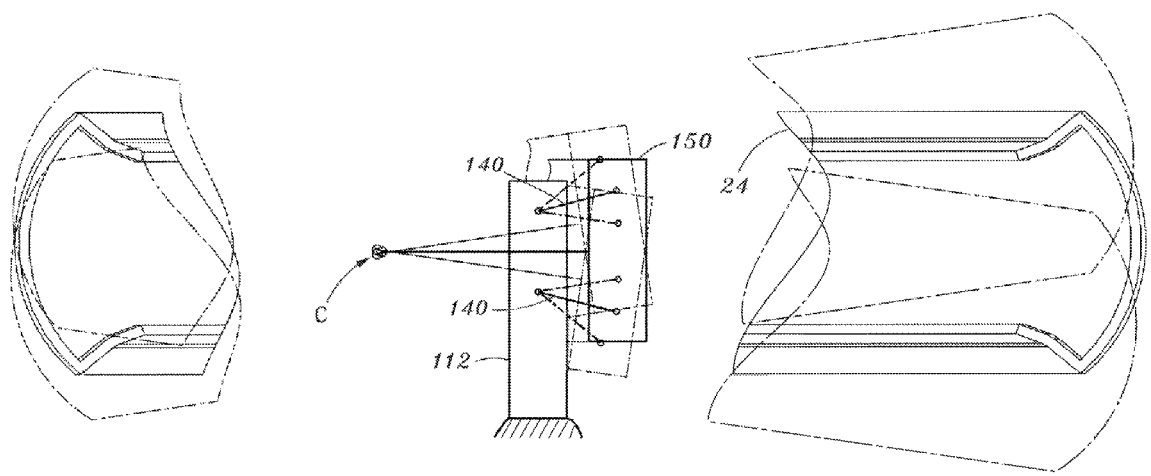

The shaft portion 118 may further be equipped with a mounting shoulder 120 for non-rotatably engaging the leveling bracket 80. As was further mentioned, the leveling bracket 80 is angularly non-moveable by means of a leveling rod 78 which extends to an aft end of the swingarm 64. In this regard, the leveling bracket 80 may be secured to the mounting shoulder 120 on the shaft portion 118 by means of at least one and, more preferably, a pair of grooves. The grooves facilitate securing the leveling bracket 80 to the mounting shoulder 120 with a pair of mechanical fasteners 190 extending through a clamp portion 82 which engages the grooves. The mechanical fasteners 190 mate with bores 134 (i.e., threaded holes) formed in leveling bracket 80 as best seen in FIG. 4H.

A circumferential edge of the mounting shoulder 120 may be formed to provide a surface for bearing against the innermost bushing 124 of the shaft housing 66. In this manner, the castellated nut 128 may be torqued to provide a desired mount of axial force against the edge of the mounting shoulder 120. Ideally, the castellated nut 128 is torqued to an amount sufficient to allow free rotation of the shaft portion 118 when the leveling bracket 80 is disconnected but which is also sufficiently snug to prevent lateral or non-concentric movement of the shaft portion 118 relative to the bushings 124.

Referring back to FIG. 3, the ground link 112 can be seen as being mountable to a cylindrically coupler link 150 which, in turn, is configured to rotatably support the wheel hub 188 having a rim 104 and tire 106 affixed thereto. In this regard, one of the opposing ends of the cylindrical coupler link 150 may include a circumferential lip which is specifically adapted to bear against a side of one of an opposing pair of wheel bearings 160 mounted on the coupler link 150. The wheel hub 188 is also supported by the wheel bearings 160 to allow the wheel hub 188 to rotate relative to the coupler link 150. As best seen in FIG. 4D, the lip preferably has a height sufficient to allow free rotation of an inner ring of the wheel bearing 160 but not interfering with free rotation of the outer ring of the wheel bearing 160.

The coupler link 150 extends across a width of the wheel hub 188 and slightly laterally therepast on one side. As best seen in FIG. 4D, the outer edge of the coupler link 150 includes threads for threadably engaging a wheel nut 184. The wheel nut 184 may further include a washer 126 for bearing against the outer side of the wheel bearing 160. A spacer 186 may be coaxially disposed over the coupler link 150 and may be sized to maintain the appropriate spacing between the wheel bearings 160.

Referring back to FIG. 3, the wheel hub 188 is preferably coaxially disposable over the spacer 186 and may further include circumferential shoulders formed on an inner surface of the wheel hub 188 at opposing ends thereof. Each of the shoulders is preferably sized and configured to be complimentary to the wheel bearings 160 in order to allow seating of the wheel bearings 160 therewithin. In this regard, the wheel bearings 160 may be press-fit into the shoulders to prevent relative rotation between the wheel hub 188 and the wheel bearings 160. Optionally, the wheel hub 188 may include radially outwardly-extending dowel pins (not shown) which may be press-fit into the wheel hub 188. The dowel pins are preferably sized and configured to fit into channels (not shown) formed in the rim 104 to prevent relative rotation between the wheel hub 188 and the rim 104. Serrations may also be formed in the respective components to non-rotatably connect the wheel hub 188 to the rim 104.

Referring more particularly now to FIGS. 4C-4H, the coupler link 150 has a generally hollow cylindrical configuration with a pair of opposing mounting pads 152 formed thereon for supportably receiving the follower links 140. As was earlier mentioned, the follower links 140 are configured to pivotally interconnect the ground link 112 to the coupler link 150. As can be seen in FIG. 4H, the opposing mounting pads 152 of the coupler link 150 are disposed in generally spaced arrangement relative to one another and define a pad spacing 154. Each of the mounting pads 152 extends across a length of the coupler link 150 as shown in FIGS. 4C-4H. However, it is contemplated that the mounting pads 152 may be locally formed in the coupler link 150. Each of the mounting pads 152 has a generally planar surface disposed in parallel arrangement to the planar surface of the opposite mounting pad 152. The mounting pads 152 are also preferably formed so as to provide clearance with the mechanical fasteners 190 which attach the follower links 140 to the beam portion 114 of the ground link 112.

Each of the follower links 140 may be comprised of a clevis portion 142 and a solid portion 146. The clevis portion 142 defines a clevis gap 144 which is sized and configured to be complimentary to a beam thickness 116 such that the clevis portion 142 is extendable over and can receive the beam portion 114. Likewise, the solid portion 146 defines a solid thickness 148 which is preferably sized and configured to be complimentary to the pad spacing 154 such that the solid portion 146 is receivable between the mounting pads 152. In this manner, the coupler link 150 is interconnected to the ground link 112 with a pivotally snug fit.

Referring more particularly now to FIG. 4B, the effective length of the ground link 112 and, more particularly, the effective length of the beam portion 114 is defined by the distance or spacing between the mechanical fasteners 190 connecting the clevis portion 142 to the beam portion 114. Likewise, the effective length of the coupler link 150 is defined by the distance or spacing between the mechanical fasteners 190 connecting the solid portion 146 to the mounting pads 152. Importantly, the effective length of the ground link 112 is shorter than the effective length of the coupler link 150. Furthermore, the ground link 112 is placed forward of the coupler link 150 which results in the instantaneous center of rotation of the four-bar linkage 110 (i.e., the steering axis C) being located forward of the wheel centerline A to provide trail to the steering mechanism 36.

As best seen in FIGS. 4A and 4B, each of the follower links 140 defines a link axis B passing through the centerlines of the mechanical fasteners 190 which connect the follower links 140 to the ground link 112 and coupler link 150. The link axes B are oriented to extend aftwardly from the ground link 112 at diverging angles relative to one another such that the link axes B intersect at the steering axis C located forward of the wheel centerline A. As a result of the unique arrangement of the four-bar linkage 110, the steering axis C defined by the intersection of the link axes B determines the location of the virtual steering axis C for the front wheel 24. Advantageously, the placement of the coupler link 150 aft of the ground link 112 creates trail which provides a self-steering capability to enhance the stability of the motorcycle 12 when moving in a forward direction. Due to the geometry of the four-bar linkage 110, as the coupler link 150 moves from side-to-side relative to the ground link 112, the steering axis C also moves slightly laterally and forward-aft. The amount of movement of the steering axis C can be minimized by altering the geometric relationship between the coupler link 150, ground link 112 and follower links 140.

Referring more particularly now to FIG. 4H, the beam portion 114 can be seen as having a generally square or rectangular cross-sectional shape although the beam portion 114 could be provided in a wide variety of alternative cross-sectional shapes and configurations. Each of the follower links 140 is attached to the beam portion 114 by means of a set of vertical bores 134 formed in opposing sides (i.e., upper and lower sides) of the beam portion 114. Bushings 124 may be inserted into the bores 134 which may be fitted with counterbores 136 for receiving the bushing 124. Shims 138 may be inserted between the bushings 124 and the beam portion 114 (e.g., within the counterbores 136) in order to provide the appropriate fit of the clevis portion 142 to the ground link 112. The shims 138 are preferably inserted on one side only and allow for adjustment of the spacing or gap to equal a clevis spacing at the clevis portion 142 of each of the follower links 140.

As best seen in FIG. 4D, each of the bushings 124 that are inserted into opposing sides of the beam portion 114 extend only partially into the bores 134. A hollow coupler shaft 182 having internal threads may be inserted into the bushings 124 such that the clevis portion 142 encapsulates each coupler shaft 182 and pair of bushings 124. The subassembly may be held in place using mechanical fasteners 190 such as a bolt and washer combination which extend into each side of the clevis portion 142. To prevent the coupler shaft 182 from rotating while the bolts are tightened into the internally threaded coupler shaft 182, transverse holes 158 may be formed in the coupler shafts 182.

The transverse holes 158 in each of the coupler shafts 182 are preferably positioned to be in alignment with a pair of transverse holes 158 formed in the beam portion 114 as best seen in FIG. 4H. In this manner, when assembling the follower links 140 to the ground link 112, a small rod may be temporarily extended into the transverse holes 158 in the ground link 112 and the coupler shafts 182 in order to prevent rotation thereof while the mechanical fasteners 190 are installed. Although FIG. 4H illustrates the mechanical fasteners 190 as conventional bolts with washers, it is contemplated that mechanical fasteners 190 of alternative configuration may be used. In this regard, the follower links 140 may be pivotally secured to the beam portion 114 or coupler link 150 by any suitable manner.

Attachment of the follower links 140 to the coupler link 150 is similar to that described above for the connection of the follower links 140 to the ground link 112. In this regard, the solid portion 146 of each of the follower links 140 includes a bore 134 with a pair of counterbore 136 formed on each side of the solid portion 146 for receiving bushings 124. The coupler shaft 182 may be inserted into the bushings 124 with the transverse hole 158 being positioned in alignment with a mating transverse hole 158 formed in the coupler link 150 as best seen in FIG. 4H. Assembly of the follower link 140 to the coupler link 150 is then facilitated by temporarily inserting a rod extended through the transverse hole 158 of the coupler link 150 and into the transverse hole 158 of the coupler shaft 182 while to prevent rotation of the mechanical fasteners 190 during torqueing.

The solid portion 146 of the coupler link 140 may include appropriately-sized (i.e., appropriate thickness) shims 138 inserted between the bushing 124 and the coupler link 140 on one side thereof such that the overall thickness across the bushings 124 matches the pad spacing 154 between the mounting pads 152. Ideally, the solid portion 146 of the follower links 140 is snugly but pivotally slidably receivable between the mounting pads 152 without any undo play or looseness which could affect steering precision. The mechanical fasteners 190 (i.e., bolts) for connecting the solid portions 146 to the coupler link 150 are first inserted into counterbores 136 extending into the coupler link 150 to a certain depth and which transition into bores 134 extending completely through the mounting pads 152 as can be seen in FIGS. 4C and 4H.

Turning of the front wheel 24 via the four-bar linkage 110 is facilitated by rider input at the steering drive 30 or handlebars 32. The steering input is imparted through the steering linkage to the coupler link 150 by means of the caliper mounting bracket 90 which optionally includes a steering bracket extension 102 extending upwardly from the caliper mounting bracket 90. The caliper mounting bracket 90 may be fastened to the coupler link 150 by means of threaded holes (i.e., such as the set of four holes illustrated in FIG. 4H) which are formed into the lateral sides of the mounting pads 152.

As shown in FIGS. 5A and 5B, in an alternative arrangement, steering input may be imparted to the coupler link 150 by means of a steering bracket 100 wherein the steering bracket 100 is generally configured as an elongate member having an attachment end and a pivoting end. The pivoting end is configured to be pivotally mounted to the ground link 112 and is also configured to impart lateral force or movement to the coupler link 150 by means of a slider bushing 180 which fits within a bushing aperture 174 formed in the coupler link 150 as best seen in FIG. 5B.

The steering bracket 100 illustrated in FIG. 5B may include a joggle 164 for clearance with the wheel hub 188 and brake rotor 88. The attachment end of the steering bracket 100 includes a hole for connection to the lower steering link 96. At the pivoting end of the steering bracket 100, a bore 134 may be provided for receiving a head of a pivot bolt 194. The pivot bolt 194 is non rotatably connected to steering bracket 100 by means of a pair of pins 166 which may be press-fit into receiving bores 134 formed in the steering bracket 100 and extending into the pivot bolt 194.

The pins 166 may be split lengthwise in order to provide a snug fit into the bores 134. The pivot bolt 194 itself may be mounted to a bore 134 formed in the ground link 112 between the follower links 140. A pair of bushings 124 may be included on opposing sides of the bore 134 to provide a freely pivotable attachment of the steering bracket 100 to the beam portion 114. The pivot bolt 194 may be secured by means of a nut in combination with a safety nut which may each be threadably engaged to a threaded portion of the pivot bolt 194.

Referring still to FIG. 5B, the steering bracket 100 pivots about the ground link 112 to impart lateral movement to the coupler link 150. In this regard, the steering bracket 100 includes a tang 170 which is engageable to a depression or groove formed adjacent to the pivot portion of the steering bracket 100. The tang 170 is preferably configured to tightly mate within the groove and, in this regard, is itself non-movably fixed to the steering bracket 100 by means of mechanical fasteners 190 such as Allen screws threadably engaged to holes formed in the steering bracket 100. The Allen screws may include washers 126 inserted under the heads. An upper surface of the tang 170 may include a flat 172 to allow proper seating of the Allen screws. An access hole 192 may be included in the coupler link 150 to allow for installation of the tang 170, the Allen screws and the slider bushing 180 and to provide access for installing the pivot bolt 194.

The non-flat portion of the tang 170 may have a cylindrical cross-sectional shape that is sized and configured to slidably extend into a slider bushing 180. More specifically, the slider bushing 180 may include a slider aperture 176. As was previously mentioned, the slider bushing 180 is engaged to snugly and pivotally fit within the bushing aperture 174 formed in the coupler link 150 as shown in FIG. 5B. In this manner, during pivoting of the steering bracket 100 about the pivot bolt 194, the tang 170 slides back-and-forth within the slider aperture 176 as the slider bushing rotates with the bushing aperture 174 while the coupler link 150 moves laterally relative to the ground link 112.

The above-described configuration of the four-bar linkage provides numerous advantages over conventional front fork systems. For example, the unique arrangement of the four-bar linkage 110 serves to decouple the suspension system from the steering system to some extent resulting in an overall improvement of handling as compared to conventional motorcycle 12 front ends having telescopic forks combining suspension with steering. Furthermore, the mounting of the swingarm 64 to a lower portion of the motorcycle frame 16 reduces the overall center of gravity of the motorcycle 12 which improves handling and steering response. In addition, the four-bar linkage 110 simplifies installation and removal of the front wheel 24 from one side of the swingarm 64.

The operation of the steering mechanism 36 will now be described with reference to the drawings. To initiate a turn of the front wheel 24, the steering drive 30 or handlebars 32 of the motorcycle 12 are turned left or right as desired in order to pivot the control arm 92 forward or aft. In response, the upper steering link 94 is moved forward or aft and such relative forward and aft motion is transmitted to the lower steering link 96 by means of the steering bellcrank 98 which is pivotally secured to the motorcycle frame 16. Movement of the lower steering link 96 is imparted to the coupler link 150 by means of the steering bracket extension 102 illustrated in FIGS. 1-3 or by means of the steering bracket 100 illustrated in FIGS. 5A and 5B.

Regardless of the type of embodiment used, lateral motion is imparted to the coupler link 150 of the four-bar linkage 110 for steering the vehicle 10. As was earlier mentioned, the four-bar linkage 110 is pivotally connected to the ground link 112 and the follower links 140 extend aftwardly from the ground link 112 at diverging angles. The link axes B of the follower links 140 intersect at a position which is forward of the wheel centerline A. Advantageously, this arrangement provides a desired amount of trail D such that the motorcycle 12 exhibits improved stability as compared to steering mechanisms of the prior art.

In response to lateral movement of the coupler link 150, the front wheel 24 is turned as the front wheel 24 is rotatably mounted to the coupler link 150 by means of the wheel bearings 160. While the coupler link 150 moves laterally and the front wheel 24 is turned, the ground link 112 is rigidly secured to a free end of the swingarm 64 extending forward of the motorcycle 12. The leveling bracket 80 prevents rotation of the ground link 112 and provides a means by which the angular orientation of the ground link 112 may be adjusted. The embodiment shows the ground link 112 being oriented horizontally in order to provide vertical orientation of the steering axis C. Although a vertical steering axis advantageously prevents road imperfections from inducing off-center upward forces on the front wheel 24 which can undesirably steer the front wheel 24, the ground link 112 can be rotatably adjusted to provide alternative handling characteristics. The leveling bracket 80 is connected to the motorcycle frame 16 or support arms by means of the leveling rod 78 as shown in FIG. 3.

Optionally, the steering mechanism 36 may include the suspension system which may be comprised of the shock absorber 74 and/or dampener 76 connected between the swingarm 64 and the motorcycle frame 16 as shown in FIG. 3. The suspension allows for resilient deflection of the front wheel 24 in a generally vertical direction in response to irregularities or bumps encountered as the motorcycle 12 traverses a riding surface. In addition, the suspension assembly 68 provides a means for responding to changes in the weight of the motorcycle 12 and/or rider during braking and other maneuvers.

The above description is given by way of example, and not limitation. Given the above disclosure, one skilled in the art could devise variations that are within the scope and spirit of the invention disclosed herein, including various ways of interconnecting the ground link 112 to the coupler link 150 via the follower links 140. In addition one skilled in the art could devise variations in connecting the coupler link 150 to the front wheel 24, in the configuration and mounting arrangement of the swingarm 64 and suspension (i.e., shock absorber 74) and in connecting the steering linkage to the coupler link 150. Furthermore, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A steering mechanism for a vehicle having a wheel defining a wheel centerline, comprising:
    a four-bar linkage, including:
        a ground link connected to the vehicle;
        a coupler link connected to the wheel and being located aft of the ground link; and
        a spaced pair of follower links pivotally interconnecting the ground link to the coupler link, each of the follower links defining a link axis;
    wherein the follower links extend aftwardly from the ground link at diverging angles such that the link axes intersect at a steering axis located forward of the wheel centerline;
    the vehicle including a steering drive interconnected to the coupler link and being configured to impart lateral movement to the coupler link for steering the vehicle.

2. The steering mechanism of claim 1 wherein the four-bar linkage is mounted to a front wheel of the vehicle.

3. The steering mechanism of claim 1 wherein the wheel has a wheel hub and the four-bar linkage is configured to be housed within the wheel hub.

4. The steering mechanism of claim 1 wherein the four-bar linkage is mounted on a swingarm extending outwardly from the vehicle.

5. The steering mechanism of claim 4 wherein the vehicle is a motorcycle and the swingarm extends forwardly therefrom.

6. The steering mechanism of claim 4 wherein the swingarm includes a suspension system operative to allow vertical deflection of the wheel.

7. The steering mechanism of claim 4 wherein the motorcycle includes handlebars interconnected to the four-bar linkage to allow steering input to the coupler link.

8. The steering mechanism of claim 4 wherein the ground link is non-rotatably mounted to a free end of the swingarm.

9. The steering mechanism of claim 3 wherein the coupler link has a hollow cylindrical configuration coaxially mounted within and rotatably supporting the wheel hub.

10. The motorcycle of claim 9 wherein:
    the ground link defines a beam portion having a beam thickness;
    the coupler link having a pair of opposing mounting pads formed thereinto and defining a pad spacing between the mounting pads; and
    each of the follower links including a clevis portion and a solid portion, the clevis portion defining a clevis gap sized to be complementary to the beam thickness, the solid portion defining a solid thickness sized to be complementary to the pad spacing.

11. A motorcycle defining a vehicle axis and having front and rear wheels each having a wheel hub defining a wheel centerline, the motorcycle comprising:
    a four-bar linkage having the front wheel mounted thereto and including:
        a ground link connected to the motorcycle and being oriented perpendicular to the vehicle axis;
        a coupler link connected to the wheel hub and being located aft of the ground link; and
        a spaced pair of follower links pivotally interconnecting the ground link to the coupler link, each of the follower links defining a link axis;
    wherein the follower links extend aftwardly from the ground link at diverging angles such that the link axes intersect at a steering axis located forward of the wheel centerline.

12. The motorcycle of claim 11 further comprising handlebars interconnected to the coupler link and being configured to impart lateral movement thereto for steering the motorcycle.

13. The motorcycle of claim 11 wherein the four-bar linkage is housed within the wheel hub.

14. The motorcycle of claim 11 further comprising a forwardly extending swingarm having the ground link non-rotatably attached to a free end of the swingarm.

15. The motorcycle of claim 14 wherein the swingarm is pivotally attached to the motorcycle and including a suspension system operative to allow vertical deflection of the wheel.

16. The motorcycle of claim 14 wherein the swingarm extends forwardly from the motorcycle along one of opposing sides of the front wheel.

17. The motorcycle of claim 16 wherein the four-bar linkage is configured to allow for installation and removal of the front wheel from a side of the swing arm opposite the four-bar linkage.

18. The motorcycle of claim 11 wherein the coupler link has a hollow cylindrical configuration configured to rotatably support the wheel hub.

19. The motorcycle of claim 11 wherein:
    the ground link defines a beam portion having a beam thickness;
    the coupler link having a pair of opposing mounting pads defining a pad spacing therebetween; and
    each of the follower links including a clevis portion and a solid portion; wherein:
    the clevis portion defining a clevis gap sized to be complementary to the beam thickness such that the clevis portion is extendable over the beam portion;
    the solid portion defining a solid thickness sized to be complementary to the pad spacing such that the solid portion is receivable between the mounting pads.

* * * * *